INVENTORS
ROBERT H. LAWSON
JOHN B. LAWSON
BY
Paul & Paul
ATTORNEYS

INVENTORS
ROBERT H. LAWSON
JOHN B. LAWSON
BY
Paul & Paul
ATTORNEYS

April 5, 1966   R. H. LAWSON ETAL   3,243,975
METHOD AND APPARATUS FOR UNIFORMIZING THE
STITCHES OF KNITTED FABRICS
Filed Oct. 15, 1964   11 Sheets-Sheet 3
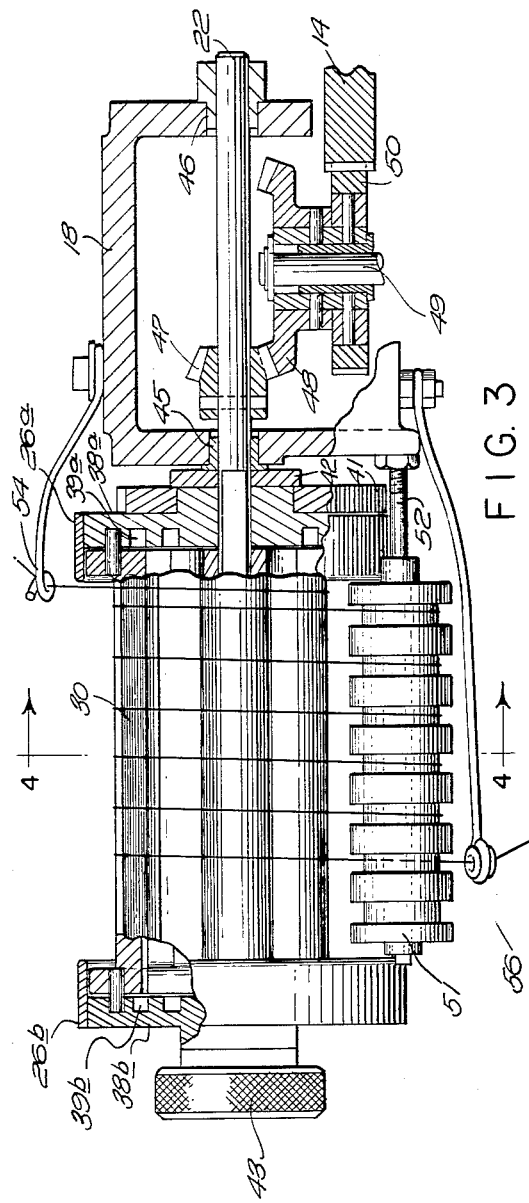
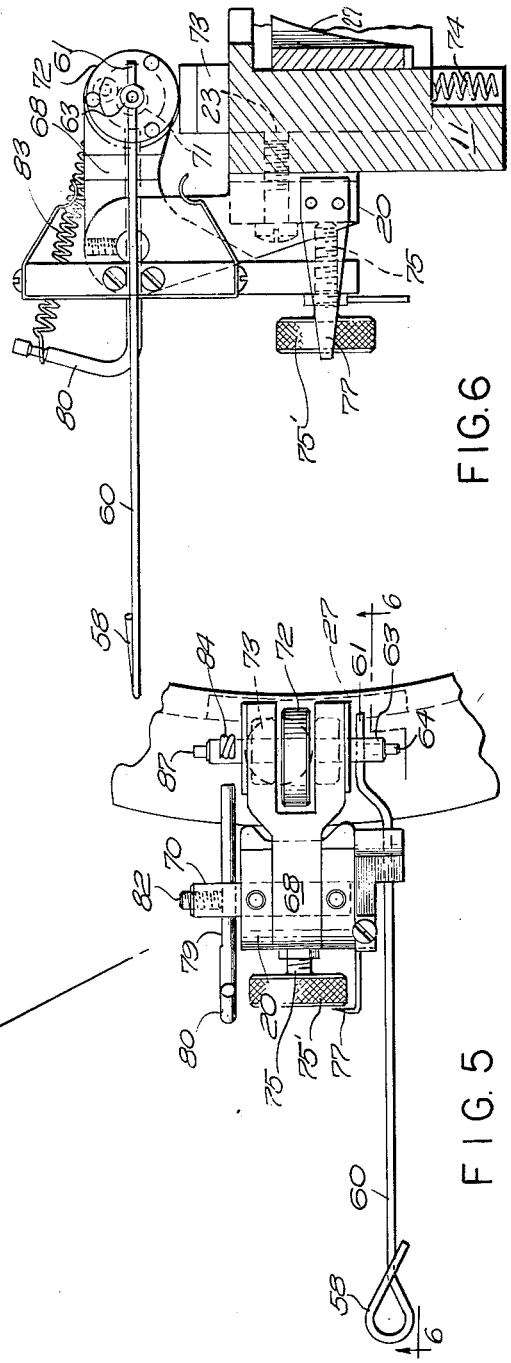
INVENTORS
ROBERT H. LAWSON
JOHN B. LAWSON
BY
*Paul & Paul*
ATTORNEYS April 5, 1966  R. H. LAWSON ETAL  3,243,975
METHOD AND APPARATUS FOR UNIFORMIZING THE
STITCHES OF KNITTED FABRICS
Filed Oct. 15, 1964  11 Sheets-Sheet 4

INVENTORS
ROBERT H. LAWSON
JOHN B. LAWSON
BY
*Paul & Paul*
ATTORNEYS

INVENTORS
ROBERT H. LAWSON
& JOHN B. LAWSON
BY
Paul & Paul
ATTORNEYS

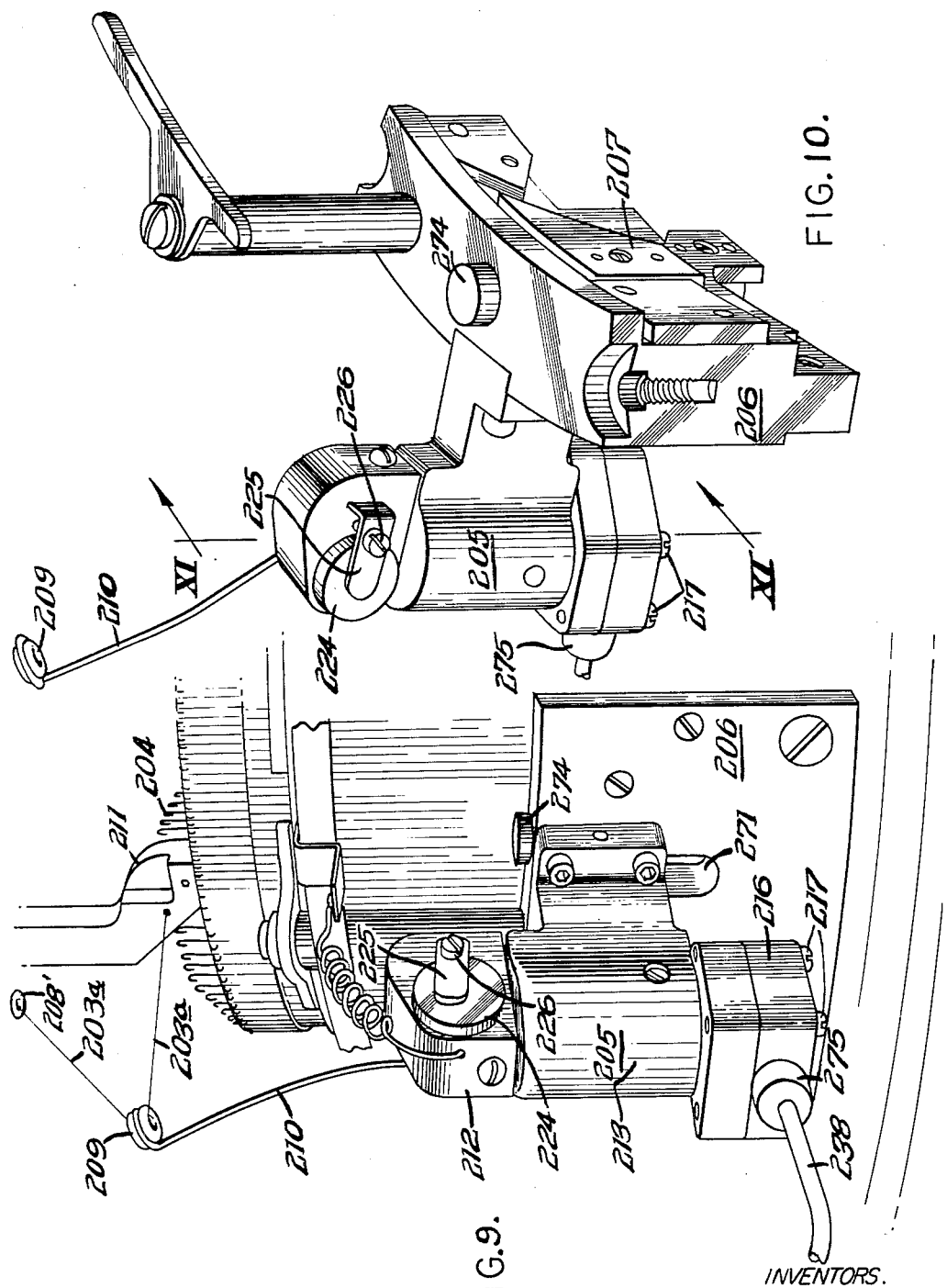

INVENTORS
ROBERT H. LAWSON
& JOHN B. LAWSON
BY Paul & Paul
ATTORNEYS

INVENTORS
ROBERT H. LAWSON
& JOHN B. LAWSON
BY Paul & Paul
ATTORNEYS

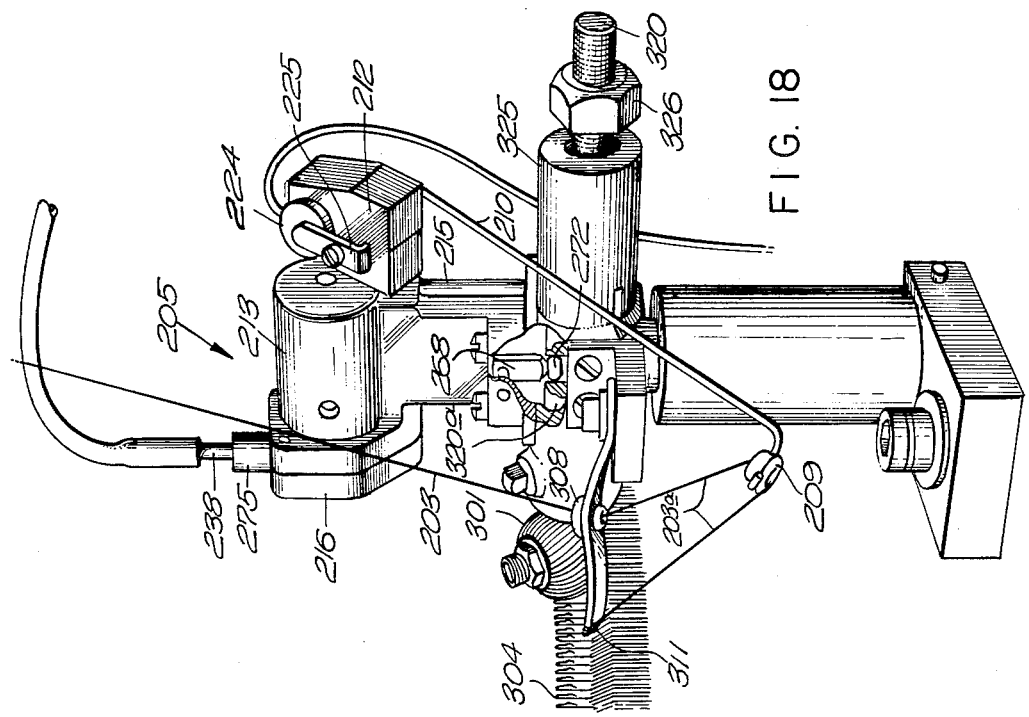
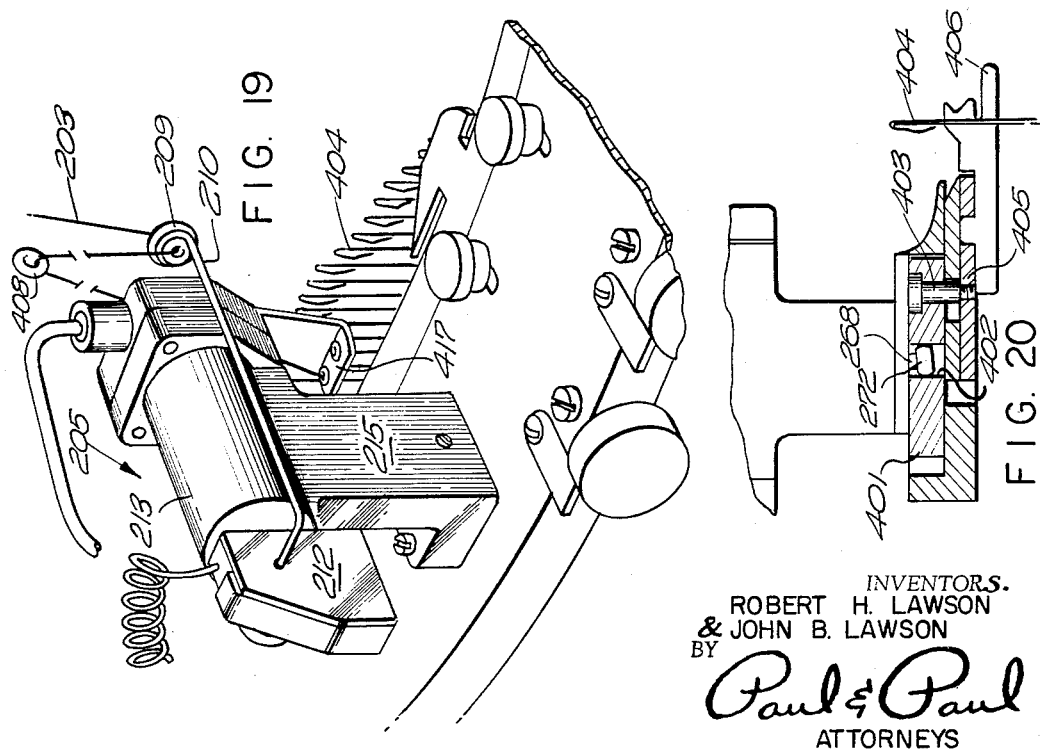

3,243,975
METHOD AND APPARATUS FOR UNIFORMIZING THE STITCHES OF KNITTED FABRICS
Robert H. Lawson, Pawtucket, and John B. Lawson, Barrington, R.I., assignors to Lawson Engineering Company, Pawtucket, R.I., a corporation of Rhode Island
Filed Oct. 15, 1964, Ser. No. 405,023
36 Claims. (Cl. 66—132)

This application comprises a continuation-in-part of our now abandoned U.S. patent applications Serial Nos. 153,079, filed November 17, 1961 and 340,905 filed January 29, 1964, for "Apparatus and Method for Controlling the Stitch Lengths of Knitted Fabrics" and "Apparatus for Uniformizing the Stitches of Knitted Fabrics," respectively.

This invention relates to the knitting of fabrics having stitches of a uniform, predetermined size, and wherein the courses each contain a predetermined length of yarn. More particularly, this invention is concerned with apparatus and method for uniformizing the stitches of knitted fabrics wherein yarn is positively supplied, without slippage, to a knitting machine at a predetermined rate and under a predetermined constant tension, with automatic adjustment of the stitch drawing elements during operation of the machine whereby each course of the fabric contains a predetermined length of yarn formed into stitches of uniform size.

One of the problems long encountered in the knitting industry is the lack of dimensional control over knitted fabrics. With the various types of knitting machines presently in use, dimension variations in fabrics, based on yarn content, are quite likely to range up to 15%. These variations arise from the fact that in the process of knitting, non-uniform lengths of yarn are knitted into the fabric courses. These irregularities in the amount of yarn knitted into fabric courses occur for many reasons.

For example, the uneven tensions under which a yarn is wound upon a cone or pirn may affect the size of stitches during knitting, and hence the amount of yarn in the fabric courses. Similarly, during the process of knitting, variation in machine speed affects the motion of the needles such that the faster the machine travels the longer the stitches it will tend to knit, and the tension devices and yarn guides in the machine may become roughened or grooved as a result of wear. Occasionally, yarn tension devices may become clogged in such a way as to reduce the drag on the yarn, in which event the length of yarn per course in the fabric will be increased.

Other factors which affect the size of the stitches being knit in a knitting machine are expansion of the metal parts and the thinning of the lubricating oil as the machine is operated. These changes in the operating conditions of the machine effect changes in the co-action of the stitch drawing elements, and thus will vary the size of the stitches being knit.

Over the years, numerous attempts have been made to overcome the problem of dimensional instability of knitted fabrics. In the main, these attempts have comprised the utilization of positive yarn feeding devices correlated to the speed of the knitting machine. Such devices are intended to positively deliver a predetermined length of yarn to a predetermined number of knitting needles. For example, in the case of circular machines, such devices are intended to positively deliver a predetermined amount of yarn to the knitting needles for each revolution of the needle cylinder relative to the yarn feed.

Such positive yarn feed devices have been only partially successful in overcoming the problem of dimensional instability of knitted fabrics. Primarily, this is because such devices are concerned only with the delivery of yarn to the needles, and do not deal with the variable conditions or external influences to which the yarn may be subjected between the positive yarn feed device and the needles. Nor do such devices deal with the factors which may influence the amount of yarn drawn by the needles. More specifically, such devices ignore the conditions brought about by changes in the speed of the machine, the clogging or wearing of the yarn guides, or by the thinning of the lubricating oil or the expansion of the metal parts of the machine as the knitting operation progresses. Additionally, none of the positive yarn feed devices developed in the past have fully overcome the problem of yarn slippage. Thus, the solutions heretofore offered do not ensure dimensional stability of knitted fabrics for the reason that they are not directed to all of the problems which result in non-uniform stitches in the fabric.

The primary object of this invention is to provide method and apparatus for uniformizing the stitches of knitted fabrics. Stated broadly, this objective is accomplished by maintaining the yarn demand of the knitting machine i.e., the rate at which incoming yarn is accepted by the stitch drawing elements, exactly in balance with the rate of which yarn is positively fed or supplied thereto, while maintaining constant yarn tension at all times during knitting.

More specifically, one feature of our invention is a novel positive feeding device which is capable of supplying yarn to selected uniform rates, without slippage, to the knitting machine.

Having thus provided for uniformity in the rate of incoming yarn, it has been necessary to provide means for maintaining the yarn demand of the machine in balance with the rate of incoming yarn. Since influences occur which tend to alter the rate at which incoming yarn is consumed, another feature of our invention comprises a control device which immediately detects any impending imbalance between the feed rate and consumption rate and which simultaneously adjusts the yarn demand of the machine by the amount required to maintain the balance. As will be explained in detail, the actual physical adjustment is of those elements of the machine which control the amount of yarn drawn, i.e., the stitch drawing elements.

In summary, the purpose of this invention is to provide method and apparatus for automatically detecting variations between the amount of yarn positively fed to the machine, and the amount of yarn demanded by the machine, and for automatic adjustment of the knitting elements relative to each other simultaneously with, and at the same rate, as said variations to compensate immediately and exactly therefor, so that the rate of yarn demanded by the machine is maintained in balance with the rate at which yarn is furnished thereto, whereby uniform stitches are knit throughout the fabric.

A further object of this invention is to provide apparatus and methods for knitting weft fabrics wherein the yarn is fed positively to the knitting machine at a selected rate under a predetermined constant tension, and further including stitch regulator means to maintain the demand of the machine for incoming yarn in balance with the rate of yarn fed thereto regardless of external influences acting upon the yarn or the stitch drawing elements, whereby each course of the fabric being knit will contain substantially equal lengths of yarn and stitches of substantially uniform size.

More specifically, another object of this invention is to provide stitch length control means for circular knitting machines incorporating positive yarn furnishing means and means for automatically and simultaneously adjusting the position of the stitch cam relative to the cylinder during knitting, in direct and immediate response to a change in demand for incoming yarn by the needles, to maintain such yarn demand in constant balance with the rate at which the yarn is furnished to the needles to knit stitches of uniform length throughout the fabric.

A further object is to provide stitch control mechanism which imposes a constant yarn tension and automatically detects variations between the rate of yarn positively fed to, and the rate of incoming yarn accepted by, the stitch drawing elements and, by use of fluid means, adjusts said elements relative to each other simultaneously with, and at the same rate as, said variations to compensate immediately for such variations, thereby to maintain the rate of yarn acceptance by the stitch drawing elements in balance with the rate at which yarn is furnished thereto.

A further object of this invention is to provide improved automatic stitch control mechanism for knitting machines which eliminates the necessity for manual adjustment of the stitch drawing elements in changing from one fabric to another.

A further object of this invention is to provide a servo-operated stitch control mechanism in association with positive yarn feeding means whereby the stitch drawing elements of a knitting machine may be automatically adjusted merely by selectively setting the rate at which said positive means feeds yarn.

A further object of this invention is to provide a generally improved positive feeding means for textile machines, such means having a diametrically adjustable peripheral surface about which a strand of the material to be fed to the machine is wound, and further having means for varying the rate of feed of said strand to the machine by enlarging or reducing the diameter of said peripheral surface.

Another object is to provide a calibrated positive yarn feeder so that a known amount of yarn may be fed per course to a knitting machine.

Other objects and advantages of this invention will be readily apparent to those skilled in the art from the following description of a preferred embodiment thereof, as illustrated in the drawings, wherein:

FIG. 3 is an enlarged partially sectioned view in side elevation of the yarn feeding device.

FIG. 5 is an enlarged fragmentary view in top plan of the stitch cam regulator.

FIG. 6 is a sectional view taken in the direction of the angled arrows 6—6 of FIG. 5.

FIGS. 9 and 10 comprise enlarged views in perspective of the modified stitch control device affixed to a cam cylinder section of the machine.

Figures 11, 12:
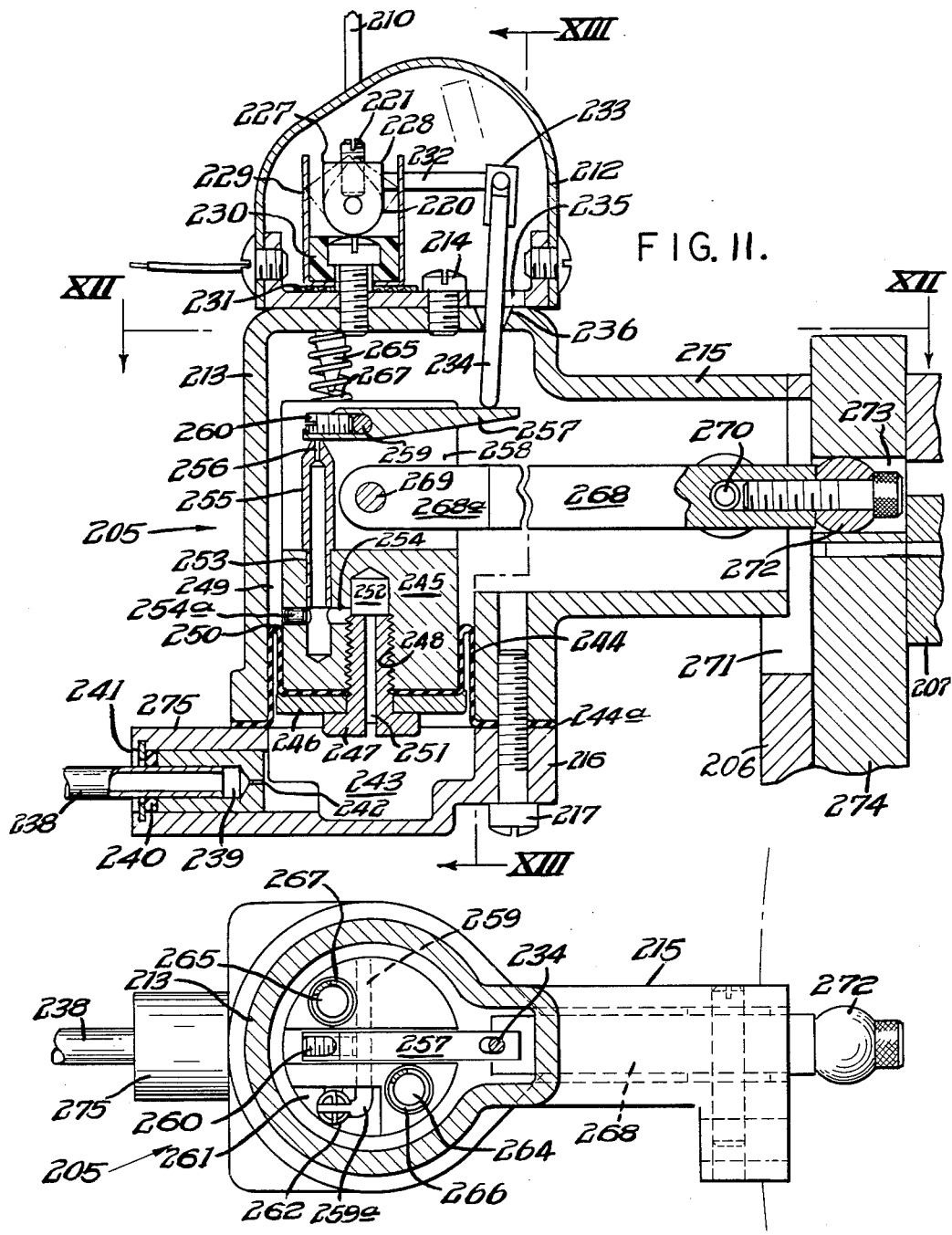

FIG. 11 is a side elevation in section of the modified stitch control device taken in the direction of the angled arrows XI—XI in FIG. 10.

FIG. 12 is a plan view in section of the modified stitch control device taken in the direction of the angled arrows XII—XII in FIG. 11.

Figure 13:
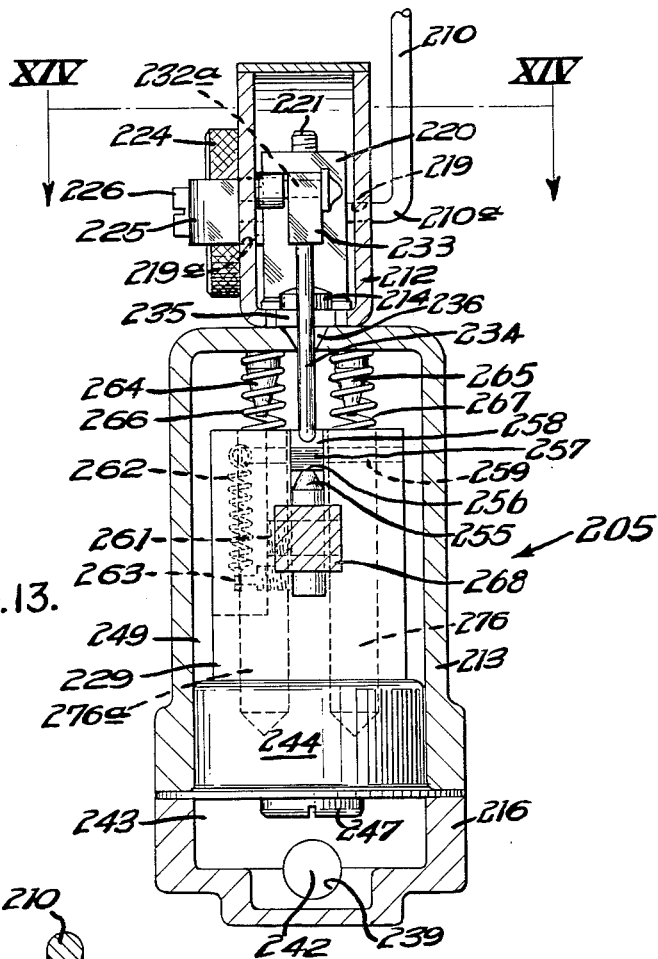

FIG. 13 is a front elevation in section of the modified stitch control device taken in the direction of the angled arrows XIII—XIII in FIG. 11.

Figure 14:
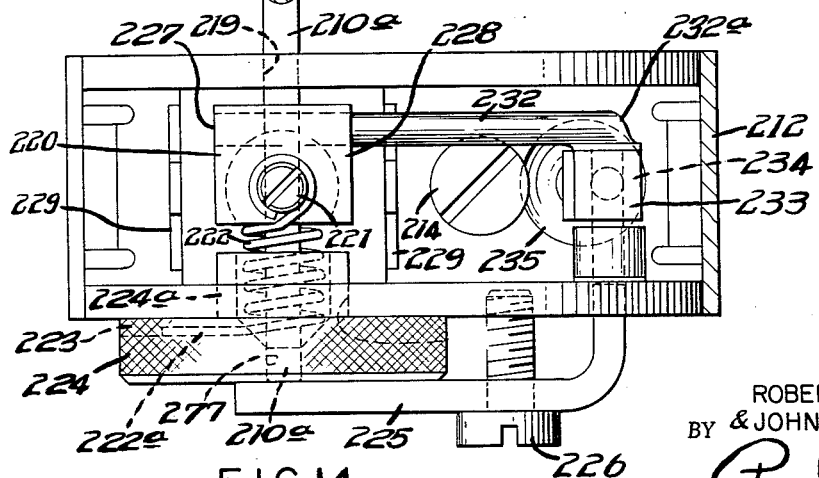

FIG. 14 is a plan view in section of the modified stitch control device taken in the direction of the angled arrows XIV—XIV in FIG. 13.

Figure 15:
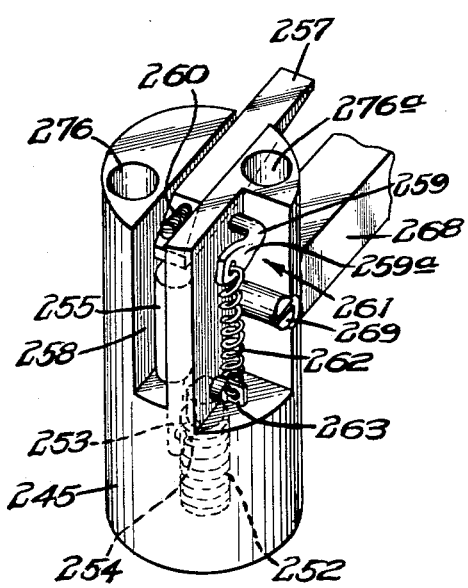

FIG. 15 is a rear perspective view of the piston for the modified stitch control device.

Figure 16:
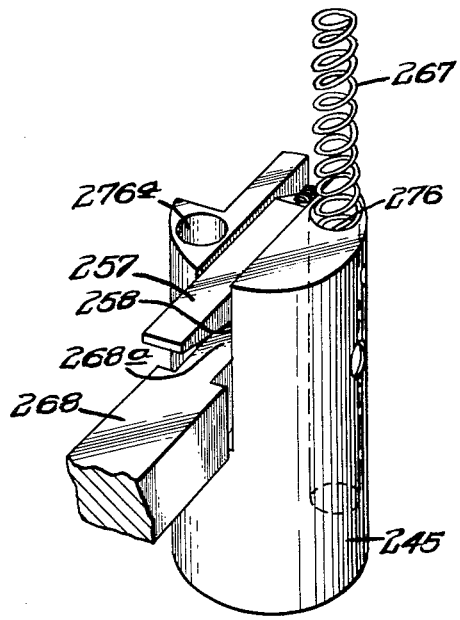

FIG. 16 is a front perspective view of the piston.

Figure 17:
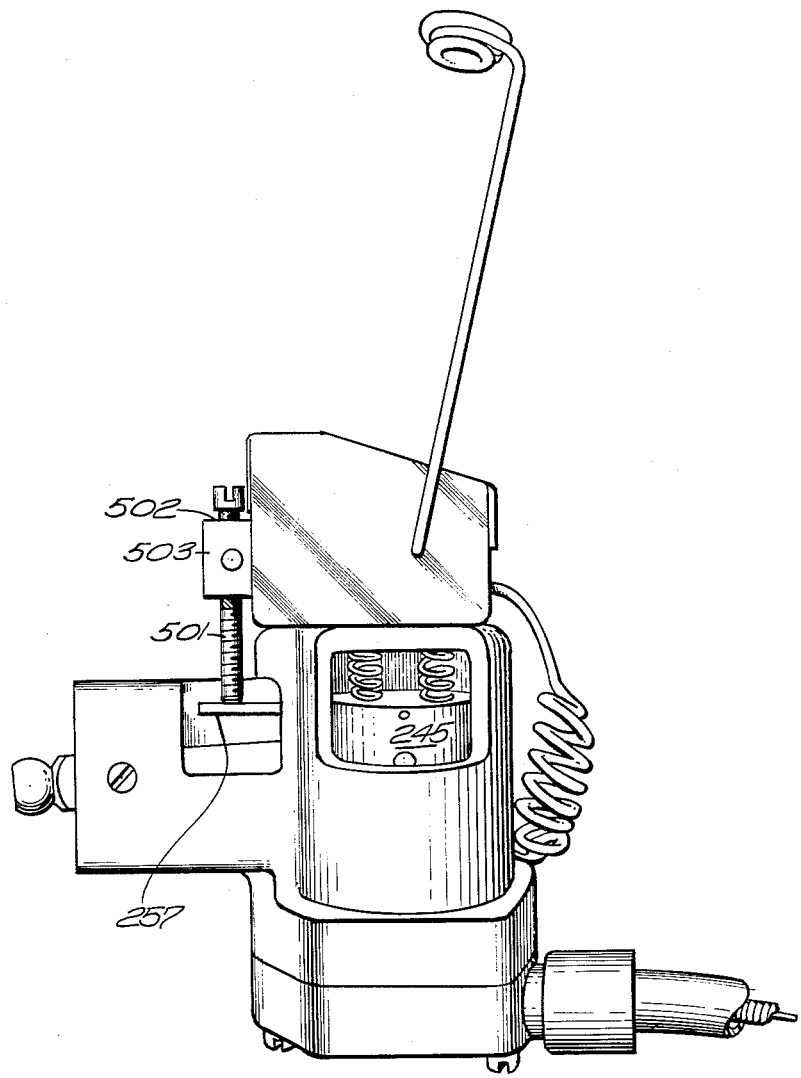

FIG. 17 is a perspective view of a modification of the stitch control device of FIGS. 8–16, with certain parts cut away, to show the manner in which the limit control is applied.

FIG. 18 is a perspective view of the modified stitch control device adapted to a burr wheel.

FIG. 19 is a perspective view of the modified stitch control device applied to the stitch cam for the sinkers of a spring needle knitting machine.

FIG. 20 is a view in section showing the manner in which the stitch control device is connected to the sinkers of the machine shown in FIG. 19.

In describing the preferred embodiment of the invention illustrated in the drawings, specific terminology will be restored to for the sake of clarity. However, it is not the intention to be limited to the specific terms so selected, and it is to be understood that each specific term includes all technical equivalents which operate in a similar manner to accomplish a similar purpose.

The term "constant tension" used throughout the specification and claims hereof is not intended to refer to a theoretical optimum condition impractical of realization in a knitting machine, but rather is intended to indicate a substantially uniform tension which would be recognized by those skilled in the art as being, within practical limits, a constant tension.

The term "uniform size" used throughout the specification and claims hereof in reference to knitted stitches is not intended to refer to a theoretical optimum condition impractical of realization in a knitting machine, but rather is intended to indicate a substantially uniform size which would be recognized by those skilled in the art as being, within practical limits, a uniform stitch size.

The term "uniformize" as applied to knitted stitches throughout the specification and claims hereof indicates that the stitches in a knitted fabric are of uniform size, uniform shape and have been set into the fabric under constant tension.

The term "yarn demand," when used herein in connection with a knitting machine or the stitch drawing elements thereof, shall mean the rate at which yarn is accepted from an external source of supply by the stitch drawing elements at a selected tension.

The term "hydraulic" used throughout the specification and claims hereof is not intended to be limited in meaning to the use of liquids, as in its generally accepted sense, but it is used herein, for convenience, in a broader sense to indicate the use of fluids, whether liquids or gases, such as compressed air.

The terms "simultaneously" and "immediately," used throughout the specification and claims hereof to describe the speed at which variations in yarn demand are sensed and compensated for, are not intended to refer to theoretical optimum occurrences, impractical of realization in a knitting machine, but rather are intended to indicate a speed of sensation, reaction or adjustment which would be recognized by those skilled in the art as being, for practical purposes, simultaneous or immediate.

The term "stitch drawing elements" as used in the specification and claims hereof indicates those parts of a knitting machine which are employed to measure out the yarn to form the stitches including, but not limited to, cylinder needles, dial needles, sinkers and appropriate stitch cams therefor, and burr wheels where used.

Figure 1:
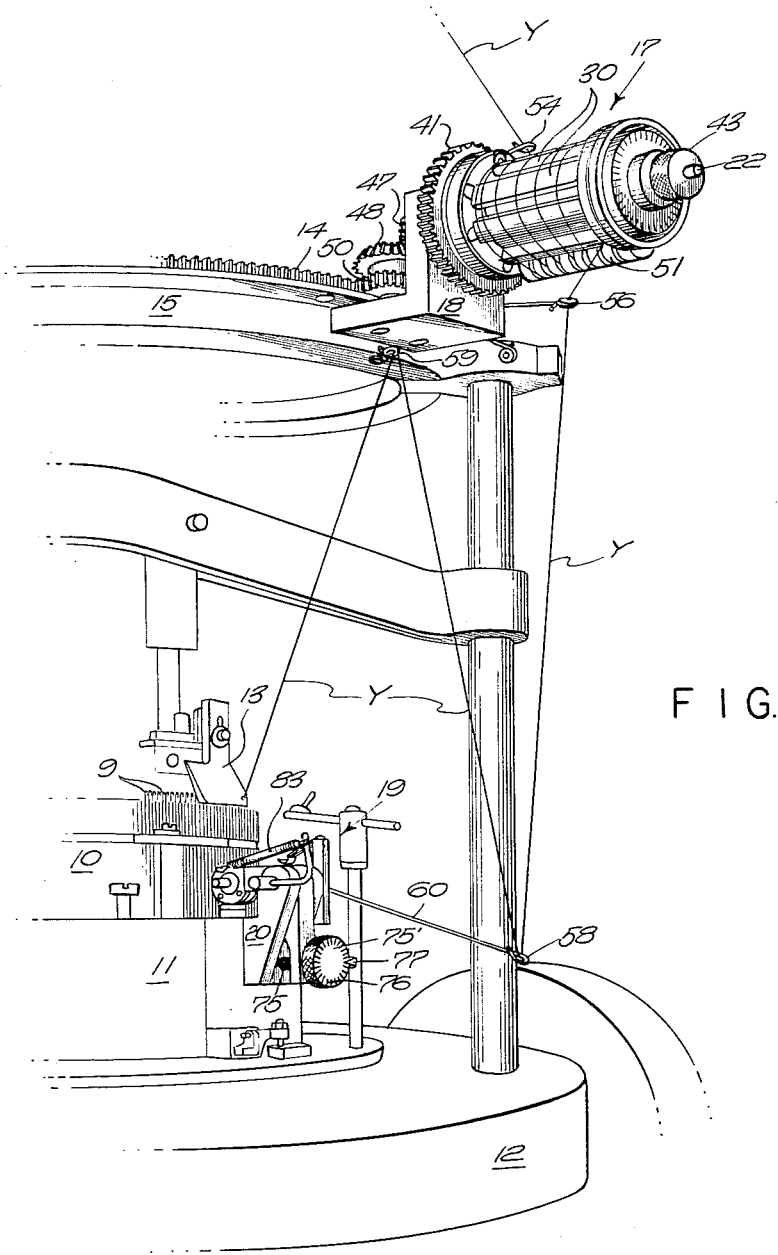
FIG. 1 is a fragmentary view in perspective showing the positive yarn feeding device and automatic stitch cam regulator of this invention as applied to a circular knitting machine.

Turning now to FIGS. 1–7 of the drawings, there is shown a preferred embodiment of this invention applied to a circular knitting machine of the rib body type. Specifically for the purpose of illustration, the machine shown in FIG. 1 is the well known Scott & Williams D.R.C. model used in the manufacture of rib fabrics for various types of garments. While the preferred embodiment of this invention is shown as applied to a circular rib body knitting machine, it is to be understood that the invention is readily applicable to circular jersey machines as well as rib machines and to various types of flat bed weft machines used in both plain and rib knitting.

Referring to FIG. 1, there are shown needles 9 disposed in the usual needle cylinder 10, cylinder cam section 11, bed plate 12, yarn guide 13 and dial gear 14 enclosed with the usual guard 15. Indicated generally by reference numeral 17 is the yarn feeder or yarn metering means of this invention. The yarn feeder 17 is supported by a bracket 18 which, in turn, is secured to dial drive gear guard 15 in any suitable manner.

Indicated generally by the reference numeral 19 is the stitch cam regulator or stitch length control device which, in accordance with this invention, serves to automatically control, during knitting, the position of the usual rundown stitch cam 27 (FIG. 6) relative to the needle cylinder 10. The stitch cam 27 may be of any well known type suitable for the machine to which the invention is applied, and is movable vertically relative to the needle cylinder 10 by any means well known to those skilled in the art. The stitch regulator 19 is mounted upon a bracket 20 which, in turn, is sustained upon a cam section 11 by any suitable means, such as a screw 23 (FIG. 6).

Figure 2:
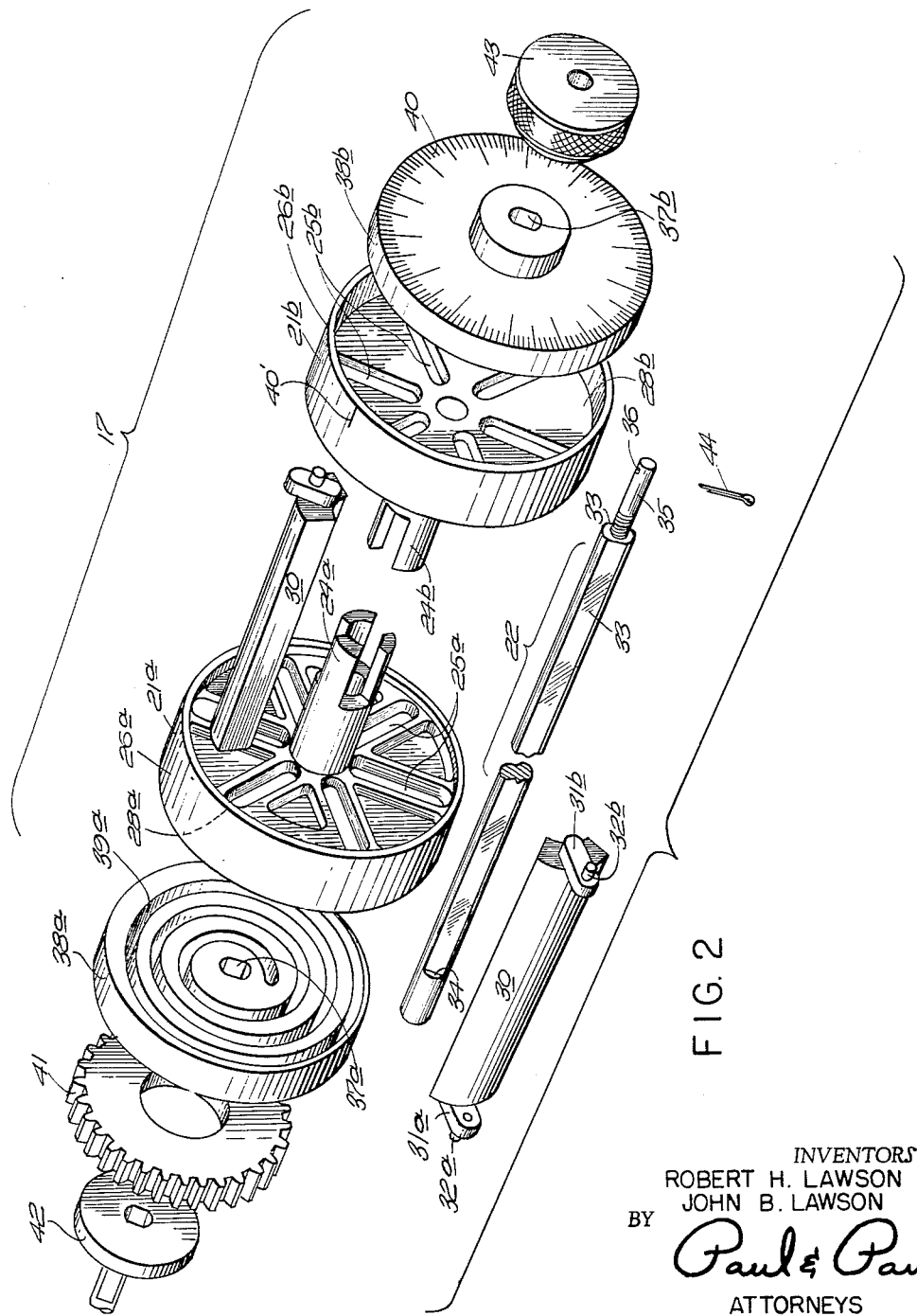
FIG. 2 is an enlarged exploded view in perspective of the yarn feeding device or "yarn feeder."
Figure 4:
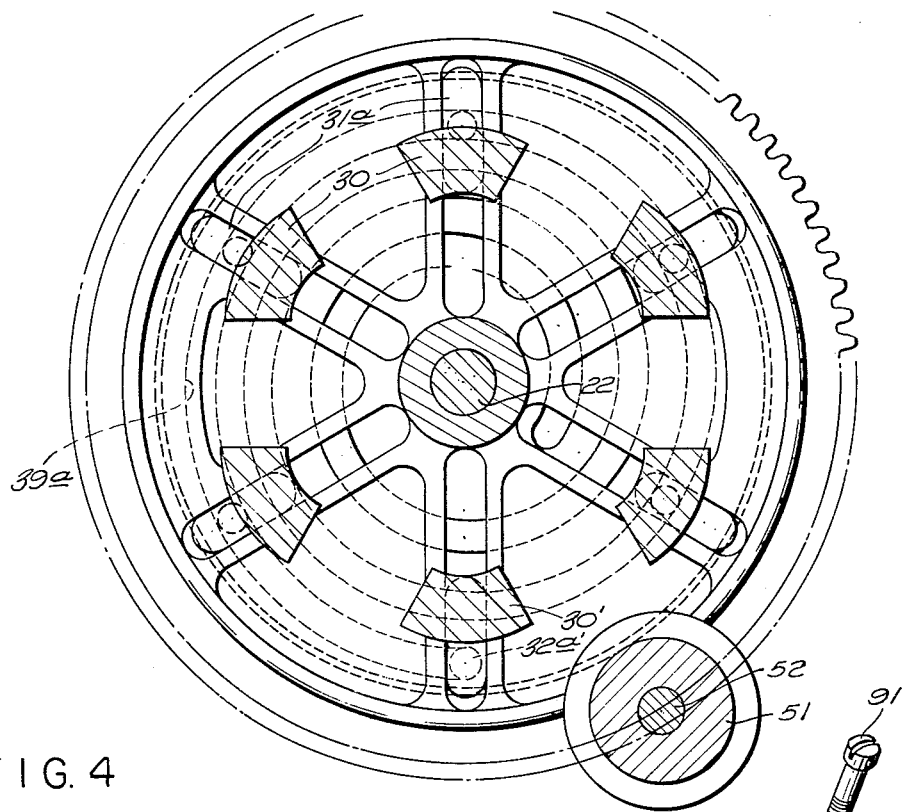
FIG. 4 is an enlarged view in section of the yarn feeding device taken in the direction of the angled arrows 4—4 of FIG. 3.

Reference now is made to FIGS. 2–4 of the drawings for a more detailed description of the yarn feeder 17. The yarn feeder incorporates a spool-like structure composed of two opposing detachable heads 21a and 21b mounted upon a shaft 22. Spool head 21a is formed with an elongated tubular component 24a which is notched at its distal end so as to engage with a similar tubular component 24b formed on spool head 21b. It is to be noted that the notches of tubular component 24a are displaced angularly with respect to the notches of tubular component 24b to permit the two components to interengage to form, with spool heads 21a and 21b, a spool-like structure.

The spool heads 21a and 21b each are formed, respectively, with a plurality of opposing radial slots 25a and 25b that terminate at their outer ends adjacent the offset rims 26a and 26b of the spool heads. The offset rims 26a and 26b form, in the outer portion of each spool head, circular cavities 28a, 28b, the purpose of which will be explained presently. It is to be noted that each radial slot 25a of spool head 21a is disposed in opposing relation to, i.e., is co-planar with, a corresponding radial slot 25b in spool head 21b.

Disposed between each opposing pair of radial slots 25a, 25b is an elongated, arcuate strand (i.e., yarn) engaging element or segment 30. At the ends of each segment 30 are elongated end pieces or slides 31a and 31b adapted, respectively, to fit snugly into the slots 25a and 25b with capacity for radial movement therein. Each of the end pieces 31a, 31b are formed with protruding pins 32a, 32b, for a purpose presently to be explained. Each pair of pins 32a, 32b are disposed, for each segment 39, at a different position in relation to the outer arcuate surface thereof. Thus, referring to FIG. 4, it will be seen that, beginning with segment 30' having pin 32a' and advancing in a clockwise direction, the pins 32a, 32b are disposed progressively radially inward of the segments 30. It is to be noted from FIGS. 3 and 4 that the axes of the segments 30 are parallel to the axis of the spool-like structure formed by the spool heads 21a and 21b, and that the outer arcuate surfaces of the segments 30 are equidistant radially from such axis. Thus, the outer arcuate surfaces of the segments 30 form a spindle, the peripheral area of which is selectively variable circumferentially, as will be explained presently.

The entire spindle-like structure comprising the spool heads 21a and 21b and the segments 30 is mounted upon shaft 22 to as to be rotatable, as a unit, relative thereto.

It is to be noted from FIG. 2 that shaft 22 is formed, on opposite sides thereof, with flattened portions 33 which, at the back end of the shaft, terminate to form shoulders 34. Inserted in the forward end of shaft 22 is a threaded stud 35 having a transverse aperture 36 formed therein adjacent its distal end.

Disposed telescopically within the circular cavities 28a, 28b of the spool heads 21a and 21b are discs 38a and 38b. As shown in FIG. 2, the inner face of disc 38a is formed with a spiral groove 39a into which engage the pins 32a affixed in the end pieces 31a of segments 30. The inner face of disc 38b similarly is formed with a spiral groove 39b (FIG. 3), such groove 39b being the mirror image of the spiral groove 39a, whereby the two spiral grooves complement each other, as explained hereinafter. The pins 32b of the segments 30 engage into the spiral groove 39b formed in the inner face of disc 38b. The discs 38a and 38b are formed with flat sided holes 37a, 37b which snugly engage shaft 22 so that their spiral grooves are in register at all times.

As previously noted, each pair of pins 32a, 32b of the segments 30 are disposed at variable positions with respect to the outer arcuate surfaces of the segments. This variation in the location of the pins of the segments 30 is such as to ensure that, when the pins are engaged in the opposing, complemental spiral grooves of the discs 38a, 38b, the outer arcuate surfaces of the segments will be equidistant from the axis of the spindle formed by spool heads 21a, 21b and the segments 30. Further, when the pins 32a, 32b are disposed in the spiral grooves of the discs 38a, 38b, the segments 30 will be spaced equally in circumferential relationship to each other.

Since the discs 38a and 38b are affixed relative to the shaft 22 by the flat sided holes 37a, 37b, the spindle composed of the spool heads 21a, 21b and the segments 30 will be rotatable with respect to the discs. As will be readily understood, movement of the spool heads 21a, 21b relative to shaft 22 and discs 38a and 38b will cause the segments 30 to contract or expand radially, depending upon the direction of relative movement. Such expansion or contraction of the segments 30 is caused by the displacement of the pins 32a, 32b in the spiral grooves 39a, 39b as the spindle is revolved relative to shaft 22. The extent to which radially retractable elements or segments 30 may expand or contract is determined by the extent to which end pieces 31a, 31b are movable radially relative to slots 25a, 25b. Thus, the peripheral surface of the spindle may be caused to expand or contract as desired, but at all times remains cylindrical in shape. Such peripheral surface, of course, will be progressively interrupted by the spacing between the segments 30 as the spindle is expanded. Preferably, but not necessarily, when the peripheral surface of the spindle is contracted to its smallest area, the segments 30 will be in contiguous relation to form, by means of their outer surfaces, an uninterrupted cylindrical surface.

A gear 41 is affixed to the outer face of disc 38a and may, if desired, mesh with a similar gear (not shown) connected to a second yarn feeder (not shown). Mounted on shaft 22 beyond gear 41 is a metal washer 42 adapted to bear against the shoulders 34 of shaft 22. A knurled knob 43 may be secured to stud 35 by means of a cotter pin 44 passing through the aperture 36 in stud 35. When knob 43 is turned clockwise, as viewed in FIG. 2, threaded stud 35 pulls the shoulders 34 of shaft 22 against the back surface of washer 42, thus tightening the whole assembly of the yarn feeder 17 into a unit which then will rotate with shaft 22. When knob 43 is turned counterclockwise, the yarn feeder assembly 17 is loosened, whereupon spool heads 21a and 21b may be turned freely on shaft 22 relative to the spiraled discs 38a and 38b for the purpose of expanding or contracting diametrically the spindle formed with the segments 30. A scale 40 may be disposed on the outer face of disc 38b—so made as to indicate the circumferential measure around the segments after considering the rounded surfaces and the chordal spaces between segments—to permit, in conjunction with a marking 40' on rim 26b, accurate settings of the segments 30 with respect to the spirals 39a, 39b so that exactly metered amounts of yarn may be fed, as will be more fully explained, by the yarn feeder 17 to the needles of the knitting machine.

As shown in FIG. 3, shaft 22 is supported by bearings 45 and 46 mounted in bracket 18. A bevel gear 47 is affixed to shaft 22 and meshes with bevel gear 48 mounted on stationary shaft 49. Fastened to bevel gear 48 for rotation about shaft 49 is a spur gear 50 which meshes with dial drive gear 14. Thus, shaft 22, with discs 38a and 38b affixed relative thereto, is driven, through suitable gearing, by the dial drive gear 14, the gear ratio being such as to drive shaft 22 at a predetermined rate with respect to the speed of the knitting machine. Accordingly, when the yarn feeder 17 is tightened into a unit by means of knob 43, it will rotate with shaft 22 at such predetermined speed.

Disposed below the spindle formed with the segments 30, and between the opposing faces of the spool heads 21a and 21b, is a roller 51 rotatably mounted upon a fixed shaft 52 secured to bracket 18. Roller 51 may be formed with a plurality of spaced peripheral grooves as shown, or, if desired, the grooves may be eliminated and the roller formed with a smooth cylindrical surface.

As shown in FIGS. 1 and 3, a yarn Y passes from its cone (not shown), through the usual stop motions (not shown), through a yarn guide eye 54 disposed above the yarn feeder 17, thence several times around the spindle formed with the segments 30 and then through a second yarn guide eye 56 disposed below the yarn feeder. In its first passage around the spindle, yarn Y passes between the outer surfaces of the segments 30 and the periphery of roller 51. In each subsequent passage of the yarn Y about the spindle, except for its last passage, the yarn also passes around the roller 51, going in each instance through a different groove thereof. Yarn Y is wrapped around the spindle and roller 51 a suitable number of times to eliminate any possible slippage between the yarn and the outer arcuate surfaces of the segments 30. The number of passes which the yarn should make about the spindle and roller to prevent slippage will depend, of course, upon the type of yarn being used.

The grooves in the roller 51 serve to spiral the yarn Y away from the point where it enters the yarn feeder 17. Where roller 51 is formed with a smooth cylindrical surface, the necessary spiralling of the yarn is accomplished by disposing shaft 52 at a diverging angle to the axis of the spindle. The degree of angularity thus imposed upon roller 51 will determine the distance between the successive yarn spirals.

The yarn Y passing around roller 51 will cause the roller to rotate about the shaft 52 due to the friction between the yarn and the peripheral surface of the roller. Thus, positive traction is provided for the yarn passing from the yarn feeder 17, around segments 30 and roller 51, to eye 56. Yarn Y passes from eye 56 downwardly through yarn guide eye 58 and thence upwardly to yarn guide eye 59, thus forming an elongated loop as it passes from eye 56 to eye 59. From yarn guide eye 59, yarn Y passes to the conventional yarn guide 13 for delivery to the needles of the machine. Yarn guide eye 58, disposed at the bottom of the loop of yarn, is connected, as will be more fully explained, to the stitch regulator 19.

It thus will be seen that yarn feeder 17, through its connection to dial drive gear 14, is rotated to positively deliver or feed yarn, without slippage, to the needles of the knitting machine. By proper radial adjustment of the segments 30 in the manner described, the amount of yarn delivered to the needles for each revolution of the needle cylinder 10 may be predetermined and carefully controlled. Thus by contracting the segments 30 of the spindle, the amount of yarn fed to the needles per revolution of the needle cylinder 10 is reduced, and by expansion of the segments 30, the amount of yarn fed to the needles of the machine is increased. Accurate control over the setting of segments 30 may be achieved by means of mark 40' in conjunction with scale 40, supplemented by calipers or micrometer calipers, if extreme precision is desired, or by means of other well known measuring devices.

Figure 7:
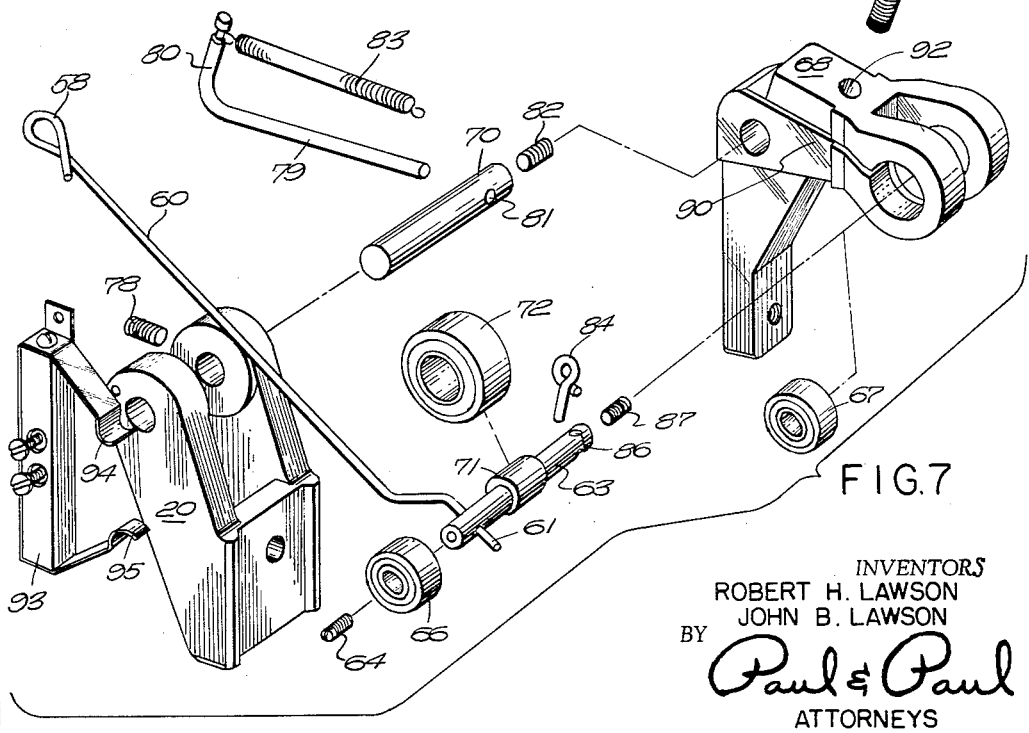
FIG. 7 is an enlarged exploded view in perspective of the stitch cam regulator.

Turning to FIGS. 5, 6 and 7, the structure and operation of the stitch regulator 19 now will be described. Yarn guide eye 58 is disposed at the distal end of an arm 60, the proximal end 61 of which is secured in shaft 63 by means of a set screw 64. Shaft 63 is supported rotatably by bearings 66 and 67 mounted in the upper, bifurcated portion of a bell crank lever 68. Bell crank lever 68 is pivotally mounted on a stud shaft 70 which, in turn, is supported by bracket 20. Stud shaft 70 is held stationary in bracket 20 by set screw 78.

The mid-portion of shaft 63 is formed with an eccentric 71. Embracing the eccentric 71 is a ball bearing 72, the outer periphery of which is adapted to rest against the top of a post or slide 73. The usual run-down stitch cam 27 is secured to the lower portion of the vertically slidable post 73 so as to be disposed in proper operative relation to the needle cylinder 10 (FIG. 6). Post 73 is urged upwardly against bearing 72 preferably by means of a spring 74, although, if desired, spring 74 may be omitted and the same result achieved by the upward pressure of the needles 9 against the stitch cam 27.

Thus, it is possible to cause post 73, and hence the stitch cam 27 affixed thereto, to move vertically upward or downward by movement of arm 60. When arm 60 is moved down, shaft 63 and eccentric 71 will be moved counterclockwise, as seen in FIGS. 6 and 7, with the result that eccentric 71, through bearing 72, will lower post 73, and also stitch cam 27 affixed thereto, thus increasing the yarn draw of the needles of the machine. When arm 60 is moved up, eccentric 71 will cause bearing 72 to be displaced upwardly relative to the top of the stitch cam carrying post 73. Spring 74 then will cause post 73 and the stitch cam affixed thereto to move upwardly, thus shortening the yarn draw of the needles. If spring 74 is omitted, the upward force of the needles 9 will be sufficient to raise the stitch cam 27 until the top of post 73 strikes bearing 72. An adjusting screw 75 controlled by a knurled knob 75' permits manual adjustment of the stitch cam 27 with respect to the needle cylinder 10 (FIGS. 5, 6).

An arm 79 formed with an upturned portion 80 is secured in a hole 81 in stud shaft 70 by means of a set screw 82. A spring 83 has one end affixed to the upturned portion 80 of arm 79, and has its opposite end affixed to a post 84 secured in hole 86 of shaft 63 by means of a set screw 87. Thus, spring 83 serves to urge arm 60, and hence yarn guide eye 58, downwardly and hence tends to urge the rundown stitch cam 27 affixed to post 73 downwardly while, at the same time, it applies a constant tension to yarn Y. Since arm 79 is adjustable in hole 81 of stud shaft 70, the amount of force exerted by spring 83 in urging yarn guide eye 58 downwardly to tension yarn Y is adjustable as desired.

When screw 75 is turned, lever 68 will pivot about stud shaft 70 to permit adjustment of the stitch cam 27 with respect to the needle cylinder. A scale 76 on knob 75' and a pointer 77 affixed to bracket 20 (FIGS. 1, 6) may be utilized to permit appropriate adjustment of the stitch cam. Thus, the setting of the stitch cam 27 with respect to the needle cylinder 10 is accomplished in two ways: first, by vertical adjustment of post 73 by means of adjusting screw 75 and, second, by the position of arm 60.

The top portion of lever 68 is split at 90 to permit the insertion of bearings 66 and 67 in the bifurcations thereof. A screw 91 engages threaded aperture 92 to close the split 90 and thus securely sustain bearings 66 and 67 in the lever 68. Bracket 93 affixed to bracket 20 comprises a dielectric sustaining contacts 94 and 95 to provide a stop motion (not shown) in case the arm 60 should move in either direction further than a predetermined distance.

By means of spring 83 and a selected setting of arm 79 on stud shaft 70, it is possible to apply a predetermined constant tension to the loop of yarn Y passing through eye 58 to the needles 9 of the machine. Post 84 is relatively short in comparison to the length of spring 83 and to the length of arm 60. Thus, in swinging through its full arc, arm 60 will extend and contract spring 83 only an insignificant amount, compared to its length, so that the tension exerted on yarn Y by the spring remains constant for any position of arm 60. Thus, with the combination of yarn feeder 17 and stitch regulator 19, it is possible to positively feed, without slippage, a predetermined or metered amount of yarn to the needles 9 of the knitting machine for each revolution of the needle cylinder 10 under a predetermined constant tension. Because the demand of the needles 9 for the yarn Y is maintained constantly in balance with the amount of yarn positively supplied by the yarn feeder 17, each course of the fabric will contain a predetermined length of yarn formed into stitches of uniform size and shape. When external influences act upon the yarn, or upon the needles or other stitch drawing elements, to upset the balance between the amount of yarn demanded, by the needles and the yarn supplied by the feeder 17, the yarn tensioning arm 60 will be moved up or down in response to such influences to automatically and simultaneously adjust the position of the stitch cam 27 to maintain the yarn demand of the needles in harmony with the amount of yarn supplied by the yarn feeder 17. The change of position of stitch cam 27, therefore, occurs simultaneously with a change in the position of arm 60, and is in direct proportion to the amount and rate of change in the size of the yarn loop through eye 58. Thus, the yarn draw of the needles during knitting is under the direct and immediate control of the yarn being furnished to the needles. In other words, with the combination aforesaid, the yarn is delivered into a loop as it passes from the positive feeder to the needles. The length of the yarn loop directly controls the position of the stitch cam. The draw of the needles is thus controlled by the amount of yarn fed at a given tension so that the amount of yarn in the stitches is controlled almost on a stitch-by-stitch basis. The loop of yarn through eye 58 actually serves as a reservoir of the yarn being fed to the machine. Any change in the amount of yarn in this reservoir is detected by arm 60 which acts as a sensor means and the movement of arm 60 causes an immediate and proportionate adjustment in the position of the stitch cam 27 to maintain the yarn demand of the needles in balance with the rate of yarn furnished thereto. Since there is a direct connection between arm 60 and stitch cam 27, the rate of any change in position of the stitch cam will be in direct proportion to the rate of any change in the amount of yarn in the reservoir, i.e. to the rate of any change in the size of the yarn loop.

For example, where certain types of knitting cams are used, the draw of the needles will increase as the machine heats up due to the thinning of the lubrication oil and expansion of the metal parts. In such situation, the needles will tend to draw more yarn than that being supplied by the yarn feeder 17, thus upsetting the desired balance or harmony between the yarn demand of the needles and the amount of yarn positively supplied. In such situation, the increased demand of the needles for incoming yarn will shorten the yarn loop between eyes 56, 58 and 59, thus raising yarn tensioning arm 60 with consequent raising of the stitch cam 27 at the same time. The raising of the stitch cam 27 will, of course, shorten the stitches drawn by the needles 9 to compensate for, i.e. neutralize, the increased yarn demand just referred to, and will maintain the balance between the yarn demanded by the needles and the amount of yarn supplied. As has been explained, the tension arm 60, now in an elevated position, will continue to impose the predetermined constant tension on the yarn Y as the yarn passes through the eye 58.

As is well known, all yarns are stretched to some extent as they are fed to and are knit by the knitting elements of a knitting machine. The extent to which a yarn is thus stretched is dependent, of course, upon the nature of the yarn and the tension applied thereto. Some plastic yarns, such as acetate, may be stretched so excessively as to undergo a substantial change in denier, and will remain in stretched condition in the fabric.

Where a yarn is fed to a circular knitting machine at a predetermined rate per revolution of the needle cylinder, and where the demand of the needles for yarn increases for some reason, the result will be to tend to stretch the yarn as it is formed into stitches, the amount of stretch being related to such demand. With certain plastic yarns, such stretching will result not only in variations in yarn denier throughout the fabric, but will cause dimensional variations as well.

With the combination of the yarn feeder 17 and stitch regulator 19 of this invention, such undesirable results will be avoided. An increased demand of the needles for yarn is compensated for immediately by raising the stitch cam 27 in the manner described above. As a result, the yarn will not be stretched unevenly, as it is knit, but the degree of yarn stretch, if any, will remain uniform, the yarn will not undergo a variation of denier in the fabric, and each course of the fabric will continue to contain a predetermined length of yarn formed into stitches of uniform size and shape.

By way of further example, let it be assumed that tension of the yarn Y passing to the needles 9 increases for some reason, e.g. due to the clogging of yarn guide 13. Such increase in yarn tension will tend to reduce the rate of travel of the yarn to the needles, thus enlarging the loop of yarn disposed between eyes 56, 58 and 59. As a result, yarn tension arm 60 will move downwardly under the influence of spring 83. Such downward movement of arm 60 will serve to cause the rundown stitch cam 27 to be lowered, whereby the draw of the needles 9 will be increased to compensate for the increased tension applied to the yarn. As a result, the balance between the yarn demanded by the needles and the rate of yarn being supplied thereto will be maintained. Arm 60 will continue to apply the same predetermined constant tension to yarn Y up to the guide 13, and each course of the fabric being knit will continue to contain the same predetermined length of yarn formed into stitches of uniform size.

Heretofore, if the draw of the needles remained constant while tension on the yarn is increased, yarn "robbing" would result and, as a consequence, the fabric stitches would be shortened. By increasing the draw of the needles in the manner just described, by the lowering of stitch cam 27, the tendency of the yarn loops to shorten due to increased tension on the yarn will be neutralized, and the stitches being knit will continue to be of uniform size and shape throughout the fabric. Should the tension increase sufficiently, the arm 60 will contact the stop motion as it moves downwardly warning the operator of the clogged condition of the yarn guide 13.

In dial and cylinder needle machines used for knitting rib fabrics, it is extremely difficult to place the dial in a plane which is parallel to the transverse plane of the top of the cylinder. Almost invariably, the plane of the dial is spaced non-uniformly from the top of the needle cylinder with the result that the needles in one portion of the cylinder draw stitches of a greater length than the diametrically opposite needles. With the application of this invention to such machine, it is possible to knit a rib fabric with uniform stitches throughout, notwithstanding such variation in the draw of the cylinder needles on diametrically opposite sides of the cylinder, since the stitch cam will be moved immediately in response and in proportion to such variation to neutralize it.

Where the draw of the needles increases, due to the wider spacing between the dial and the top of the cylinder, arm 60 and stitch cam 27 automatically will be raised to shorten the draw of the needles and maintain their demand for yarn in balance with the rate of yarn being fed by feeder 17. Similarly, on the opposite side of the cylinder, when the draw of the needles is shortened due to the closer spacing between the dial and the top of the cylinder, arm 60 and stitch cam 27 automatically will be lowered to increase the draw of the needles, thus maintaining the demand of the needles for yarn in balance with the rate of feed of the yarn by the yarn feeder 17.

Thus, where influences develop during knitting which tend to upset the balance between the rate at which incoming yarn is accepted, by the needles and the rate at which yarn is fed positively, the stitch regulator 19 automatically neutralizes such influence by immediately adjusting the position of the stitch cam relative to the cylinder in response thereto. The action of stitch regulator 19 and yarn tensioning arm 60 serves not only to maintain the rate of acceptance by the needles for incoming yarn constantly in balance with the rate of yarn supplied by yarn feeder 17, but also serves to maintain the predetermined constant tension on the yarn throughout the knitting process. Thus, each course of the fabric being knit will contain a predetermined length of yarn formed into stitches of uniform size and shape, and it is thus possible with this invention to carefully control within extremely close practical limits the dimensional stability of knitted fabrics. This is true regardless of the type of yarn being used, or the type of machine being used, or the type of fabric being knit. In this respect, it is to be understood that while the embodiment of this invention described above, has been shown as being applied to control the cylinder needles, it may readily be applied to control the dial needles also. It is also to be understood that while the foregoing embodiment of this invention discloses movement of the stitch cam 27 with respect to the cylinder 10, it is within the scope of the invention to reverse the arrangement, and provide for the movement of the cylinder 10 in relation to the stitch cam 27. As is well known in the art, it is the relative movement between the stitch cam and the cylinder which primarily governs the amount of yarn drawn by the needles during knitting.

The size of the stitches being knit may be lengthened or shortened as desired by expanding or contracting the elements 30 diametrically in the yarn feeder 17, in the manner previously described. As the spindle formed with the segments 30 is enlarged and contracted to increase or decrease the rate of yarn being fed, the stitch cam is adjusted manually downwardly or upwardly in relation thereto by positioning lever 68, by means of screw 75 and knob 75', to lower or raise stitch cam carrying post 73. Such adjustment of the stitch cam in relation to the adjustment of the segments 30 of yarn feeder 17 should be such that yarn Y normally will support arm 60 approximately in the center of its arc of swing. To accomplish this, the scale 76 on knob 75' may be calibrated to scale 40 on yarn feeder 17 so that the stitch cam 27 and yarn feeder 17 may readily be set in coordination with each other. Thus, with any adjusted setting of the mechanism of this invention, the yarn tensioning arm 60 will be in a position to raise or lower automatically the rundown stitch cam 27 sufficient to compensate for any normal change in operating conditions which would tend to cause the needles to draw longer or shorter stitches, and thus upset the desired balance between the demand of the needles for yarn and the rate of yarn supplied by the yarn feeder 17.

As previously mentioned, by means of scale 76 and pointer 77, the stitch cam 27 may be accurately adjusted with respect to the needle cylinder 10. The scale 76 is calibrated in relation to the scale 40 of the yarn feeder 17, thereby permitting coordination of the settings of the yarn feeder 17 with the settings of the stitch cam 27.

Accordingly, in preparing a machine to knit a particular fabric with this invention, the yarn feeder 17 is set to deliver a predetermined amount of yarn per revolution of the needle cylinder, and the stitch cam 27 is set, by means of scale 76 and pointer 77, to permit the needles to draw stitches of a size to harmonize the demand of the needles for yarn with the rate of yarn supplied thereto. With arm 79 properly set on stud shaft 70 to apply a predetermined constant tension to the yarn, the yarn, acting through arm 60, will control automatically and instantly the position of the stitch cam 27 to maintain the demand of the needles for yarn constantly in balance with the amount of yarn supplied thereto by the yarn feeder 17 during the knitting process.

By having each yarn in a multi-feed knitting machine wound about a yarn feeder 17, and by having a stitch regulator 19 disposed at each feed, the stitches to be knit on a multi-feed machine can be pre-set uniformly, accurately and quickly, and controlled during knitting so that such machine will knit a preselected amount of yarn per revolution of the needle cylinder at each feed.

Heretofore, in setting up a multi-feed machine to knit a particular fabric, or in changing such machine from knitting one type of fabric to knitting a different type of fabric, it has been necessary, whether or not a positive yarn feeding device was used, to set manually, by approximation, each stitch cam, then to level all the stitch cams to obtain a uniform setting, then to run the machine to obtain a sample of the fabric. Thereafter, the fabric is examined visually and the courses per inch counted to ascertain whether the fabric is satisfactory, following which the stitch cams are readjusted as required. This process of trial and error often is repeated several times until the stitch cams are finally set properly. Such process not only is time consuming, but may require the knitting of several yards of experimental fabric before the machine is properly adjusted. By means of the calibrated yarn feeder 17 and the calibrated stitch regulator 19, it is possible to change the settings of a multi-feed knitting machine quickly to knit a desired fabric from a desired yarn without resorting to the trial and error technique heretofore used which is so wasteful of both time and yarn.

Thus, with this invention, the fabric knit by a multi-feed knitting machine will contain, in each of its courses, a predetermined length of yarn formed into stitches of uniform size. If desired, it is within the scope of this invention to pass a plurality of separate yarns around the spindle of a single yarn feeder 17 for delivery to the same or to different yarn feeds of a knitting machine.

It is to be noted that the expansible spindle of the yarn feeder 17 composed of spool heads 21a and 21b and the plural segments 30 is of a nature to be useful for many purposes in addition to feeding metered amounts of yarn to circular knitting machines. Of course, such spindles will find ready use in connection with flat bed knitting machines. Indeed, spindles of this type will be useful in any operation where delivery of yarn or thread at predetermined or selected rates of travel is desired. For example, such spindles will be useful in yarn twisting machines, in machines for covering rubber yarn and in other types of machines where strands, yarns or threads are subjected to treatment.

The spindle of the yarn feeder 17 is particularly useful in pulley systems where variable speeds are desired. For example, if one of two pulley members joined by a flat belt incorporates the construction of the spindle of yarn feeder 17, the rotational speed of one pulley relative to the other can be varied by expansion or contraction of such spindle. If the driving pulley is of constant size and the driven pulley is formed with the construction of the spindle of yarn feeder 17, expansion of the periphery of the driven pulley will reduce its rotational speed.

As will be understood by those skilled in the art, this invention is readily adaptable to all types of circular hosiery machines for knitting ladies' hosiery, half hose and anklets. For example, this invention may be employed in connection with the well known Scott & Williams Model K and Model KN machines used to knit ladies' fine gauge stockings. In such machines, vertically movable rundown stitch cams of any well known type would be employed. Such stitch cams would be connected by suitable linkage to the ball bearing 72 of the embodiment of FIGS. 1–7, for example.

Because a plurality of yarns are used in knitting ladies' hosiery, the embodiment of FIGS. 1–7 would have to be modified somewhat. For example, a plurality of independent yarn tensioning arms 60', each having a yarn guide eye 58', could be pivotally mounted on the machine adjacent arm 69. Arm 60 could thus be provided with a cross-bar extending over the arms 60' so that the raising of any independent arm would encounter and raise arm 60. In this manner, each of the yarns used in knitting a stocking passes through a different eye 58', whereby each yarn controls a separate arm 60'. When a particular yarn is fed to the needles of the machine, its arm 60', bearing eye 58', is caused to rise, thereby encountering and raising arm 69 to control stitch cam 27. Thus, it is possible to control the position of the stitch cam relative to the needle cylinder for each yarn employed in the knitting of the stocking.

With such arrangement, the present means on the Scott & Williams Model K and Model KN machines for tightening or loosening the stitches, by raising or lowering the needle cylinder, still is employed. Such means is used in lieu of the adjustment made by screw 75 and knob 75' disclosed in FIG. 6 of the drawings.

Preferably, in applying this invention to a lady's hosiery machine, a separate yarn feeder 17 is employed for each yarn. As a yarn goes out of action, the metering device 17 feeding that particular yarn is stopped through a suitable clutch mechanism, which permits the yarn to overrun sufficiently to allow its arm to drop so as to disengage from the arm 60. The newly introduced yarn, of course, lifts its arm bearing eye 58 to engage arm 60 to maintain control of the stitch cam.

During the knitting of the leg of a lady's stocking as is well known, the stocking is "fashioned" as knitting progresses by decreasing the size of the stitches being knit. This is accomplished in a Scott & Williams Model K or Model KN machine by lowering the needle cylinder relative to the rundown stitch cam to decrease the size of the stitches being drawn by the needles. This adjustment is accomplished by means of levers controlled from the main drum of the machine and also from an auxiliary fashioning drum, both of which are standard equipment.

In the application of this invention to a Scott & Williams Model K or Model KN machine, such lowering of the needle cylinder still is employed to obtain a rough adjustment of the stitches in reduction of their size as knitting of the leg progresses. At the same time, suitable control means, operating under the influence of the auxiliary fashioning drum, serves to contract automatically the segments 30 of the spindle to reduce the amount of yarn being fed to the needles as their draw is reduced to knit less yarn in the courses of the leg. Precise adjustment of the needles, of course, is accomplished, in accordance with this invention, by the stitch regulator, which positions the rundown stitch cam relative to the needle cylinder to ensure that the stitches will be of uniform size, and that for a given setting of the needle cylinder, each course of the fabric will contain a predetermined length of yarn.

During the knitting of the heel and toe of the stocking, where the needle cylinder is reciprocated, all of the yarn arms are disengaged from arm 60. That arm, preferably, is raised by a lever controlled from the main drum of the machine to position the rundown stitch cam even with the reverse stitch cam, so that stitches of uniform size will be knit in all courses during the period of reciprocatory knitting.

In any application of this invention, instead of yarn Y controlling directly an arm connected to a vertically movable stitch cam, such as arm 60, yarn Y may operate on an arm controlling a servo mechanism, acting as a power multiplier, to regulate the position of the stitch cam, the height of the needle cylinder, or any other stitch control mechanism. The arrangement must be instantly responsive to movement of the control arm for the servo mechanism to move the stitch control mechanism an amount proportional to each movement of the control arm of the servo mechanism.

In FIGS. 8–20 there is illustrated a modification of the stitch control mechanism disclosed in FIGS. 1–7. In the modified form of our invention the yarn is connected to an arm controlling a servo mechanism which, with the use of hydraulic pressure, acts as a power multiplier to regulate the position of the stitch drawing elements, as follows.

Figure 8:
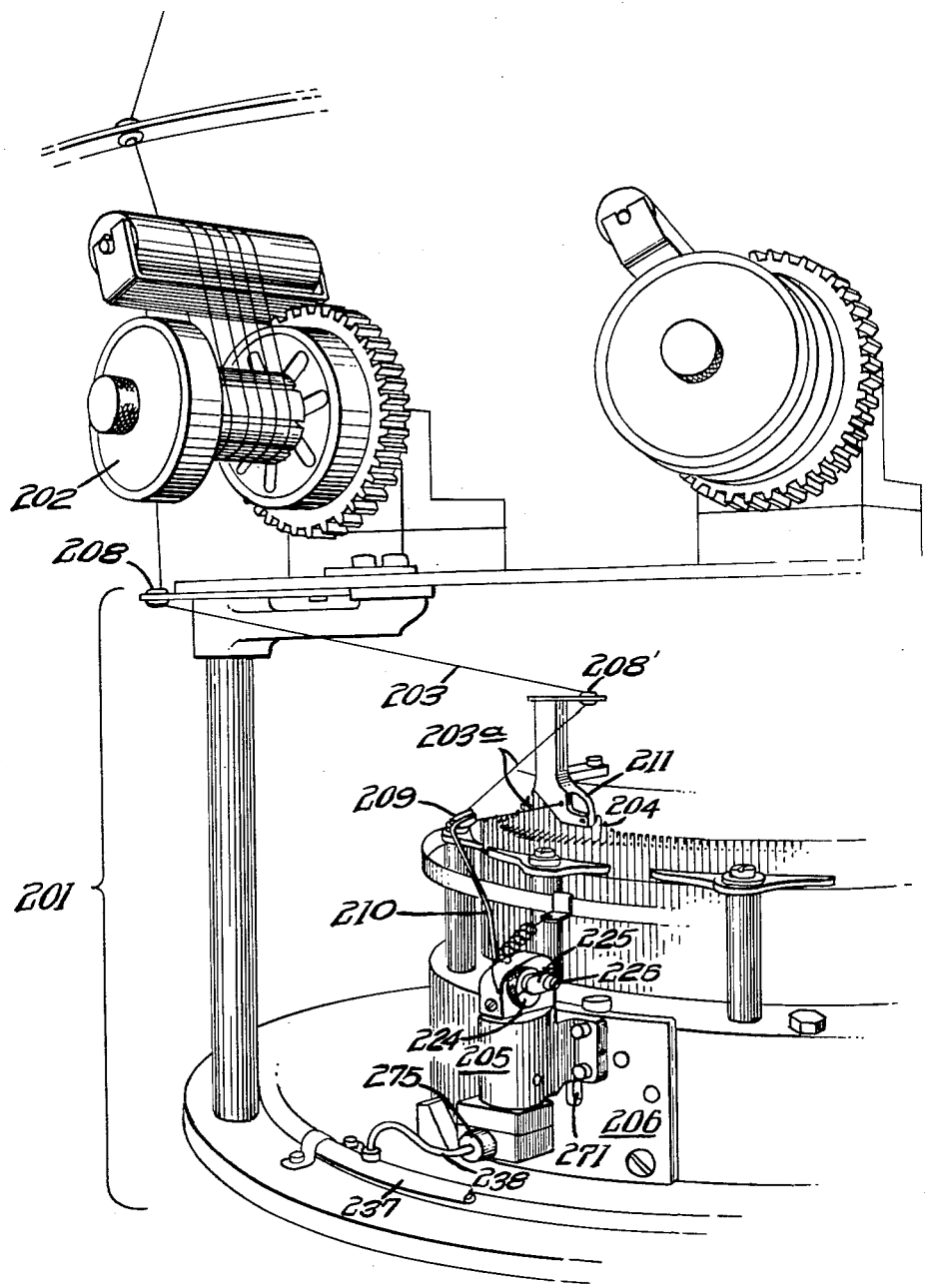
FIG. 8 is a fragmentary view in perspective illustrating a modification of the automatic stitch control device of this invention, as applied to a circular rib knitting machine.

In FIG. 8 there is shown a circular knitting machine, generally indicated by the numeral 201, equipped with a positive yarn feeding device 202, preferably of the type disclosed previously herein, for feeding a yarn 203 to the cylinder needles 204. The modified stitch control device is indicated generally by the number 205.

FIGS. 9 and 10 show the stitch control device 205 mounted on a cylinder section 206 for the regulation of stitch cam 207. Yarn 203 passes through stationary guides 208, 208' to guide eye 209 positioned at the distal end of yarn sensing arm 210, and thence to yarn guide 211 where it is directed into the hooks of the needles 204. Thus, in passing through guides 208', 209 and 211, yarn 203 forms a loop 203a supporting arm 210.

Referring now to FIGS. 11–14, stitch cam regulator 205 includes an upper hollow housing 212 fastened to a lower cylindrical housing 213 by screws 214. Housing 213 has a hollow extension 215, and is provided with a bottom portion 216 affixed in place by means of screws 217.

As shown in FIGS. 13 and 14, right angle portion 210a of arm 210 passes freely through aperture 219 into housing 212. A block 220 is affixed to arm portion 210a by means of set screw 221. The latter also serves to retain the inner end of a horizontal coil spring 222. The outer end of spring 222 has a tail 222a disposed in a slot 223 in the inner surface of a thumb wheel 224. Wheel 224 is formed with hub 224a rotatively supported in aperture 219a of housing 212. The distal end of arm portion 210a is supported for pivotal movement in axial bore 277 in wheel 224. Wheel 224 is clamped in place against housing 212 by a spring clamp 225 affixed to the outside of housing 212 by screw 226.

Block 220 has opposed horizontal edges 227 and 228 capable of scraping the opposed upstanding sides of electrical U-shaped contact 229 (FIG. 11) when block 220 is tilted about its horizontal axis. Insulators 230 and 231 prevent grounding of contact 229.

Mounted within block 220 (transversely of arm portion 210a, is one end of a cross rod 232 (FIG. 14). Cross rod 232 extends longitudinally within housing 212 and terminates in a right angle portion 232a on which is pivotally mounted a block 233. A rod 234 extends downwardly from block 233 through aligned openings 235, 236 in housings 212 and 213, respectively, and protrudes into the interior of housing 213. Since block 220 is affixed to both arm portion 210a and cross rod 232, any movement of arm 210 about the axis of its extension 210a will cause rod 234 to move vertically within housing 213.

Referring now to FIGS. 8 and 11, the stitch regulator 205 is supplied with compressed air through pipe 237 connected by a tube 238 to an air passage 239 in foot extension 275 of bottom 216 of cylinder housing 213. Tube 238 is held in foot 275 in air-tight relationship by an O-ring 240 and a staked washer 241. The inner end of passage 239 reduces to a small orifice 242 through which compressed air or other fluid enters cavity 243 of bottom portion 216 in a restricted manner.

A membrane 244 of flexible fluid-impervious material, such as synthetic rubber, is clamped to the bottom of a piston 245 by means of a cup 246 secured to piston 245 by means of a screw 247 engaged within an axially disposed threaded hole 248 in the piston. The membrane 244 extends beyond cup 246 and is doubled upon itself in the interval 249 between the opposing surfaces of cylinder 213 and piston 245, as indicated at 250, and terminates in a flange 244a clamped between cylinder 213 and its base 216. Membrane 244 prevents compressed air from passing between the opposing surfaces of piston 245 and housing 213.

Screw 247 has an axial passage 251 which opens into a cavity 252 in piston 245. Cavity 252 in turn is connected to vertical bore 253 in piston 245 by means of cross passage 254 closed at its end by plug 254a. A nozzle 255 is force-fitted into bore 253 and terminates in an orifice 256 of larger diameter than orifice 242. In the preferred form of our invention herein described, orifice 256 has more than twice the diameter of orifice 242.

Thus, compressed air from pipe 237 is permitted to pass from hollow 243, through passage 251, cavity 252, passages 254, 253, and nozzle 255 to orifice 256.

As shown in FIGS. 11, 13, 15, 16, a flapper valve 257 for orifice 256 is disposed in vertical slot 258 at the top of piston 245, and is fastened to a horizontal shaft 259 by set screw 260. Shaft 259 is rotatively mounted in a horizontal bore in piston 245 and projects into the vertical cavity 261 at the top of piston 245 where it is bent to form right angle portion 259a (FIGS. 12, 15). As shown best in FIG. 15, a spring 262 is disposed vertically in cavity 261 and is attached at the bottom of the cavity to the tab of a screw 263. The upper end of spring 262 is secured to shaft portion 259a. The torque exerted on shaft 259 by spring 262 urges flapper 257 against orifice 256 to close the same. The amount of compressed air permitted to escape from orifice 256 is regulated by the position of flapper 257 relative to orifice 256. The position of flapper 257, in turn, is controlled by rod 234 acting upon the tail of flapper 257 to move the flapper rotatively as shaft 259 rotates within the horizontal bore.

As can be seen from FIG. 13, two short pins 264 and 265 extend downwardly from the top of housing 213 and sustain a pair of compression spring 266 and 267 disposed in wells 276 and 276a respectively in piston 245.

A lever 268 (FIGS. 11, 16) having a reduced portion 268a is pivotally mounted at 269 within slot 258 of piston 245, and extends through the horizontal portion 215 of housing 213, being pivoted therein adjacent the open end of portion 215 at 270. Beyond pivot 270, lever 268 passes through a vertical slot 271 (FIG. 9) in cylinder section 206 and terminates in a ball 272 which snugly engages into a bore 273 of a vertically movable slide 274 (FIG. 11). Cylinder section 206 is provided with the usual bore for reception of the slide 274. Affixed to slide 274 in the usual manner is the rundown stitch cam 207. From the foregoing, it is clear that stitch cam 207 will be moved vertically by lever 268, as piston 245 is moved vertically within housing 213.

In preparing machine 201 for operation, thumb wheel 224 is rotated until coil spring 222, biasing arm 210 through block 220, imposes a desired amount of tension on yarn 203. Clamp 225 is then tightened by screw 226 to hold thumb wheel 224 in place. The rate of yarn to be fed is set by adjusting meter 202 in the manner previously described.

Next a fluid, preferably compressed air, is introduced through pipe 237 into hollow 243 of device 205 at a suitable pressure, such as 30 p.s.i., above atmosphere. If piston 245 is near the bottom of cylinder housing 213, orifice 256 is closed by flapper valve 257 and the compressed air causes piston 245 to rise. The upward movement of piston 245 continues until the tail end of flapper valve 257 comes into contact with rod 234, whereupon rod 234 begins to depress the end of valve 257 to open orifice 256. The torque exerted by spring 262 on valve 257 is substantially less than the torque exerted on arm 210 by yarn 203 so that the upward movement of valve 257 does not raise rod 234.

Piston 245 will cease its ascent when valve 257 is opened by rod 234 sufficiently to permit compressed air to escape or "bleed" through orifice 256 to such extent as to reduce the air pressure in cavity 243 to a level where the total force bearing upwardly against piston 245 is equal to the forces, mainly from springs 266 and 267, acting downward on the piston. At this equilibrium position, which is reached instantly for practical purposes, the amount of air escaping from orifice 256 equals the amount of air entering the system through orifice 242.

In practice we have used a cylinder and piston having an effective pressure diameter of about ½ square inch, and we have set pivot 270 three times as far from pivot 269 from the center of ball 272, which thus provides a 3 to 1 mechanical leverage on the stitch cam 207. The springs 266, 267 are set to furnish a total downward thrust of about 5 pounds which, when multiplied by the 3 to 1 leverage of lever 268, provides a force of 15 pounds to move the stitch cam 207 up when the flapper 257 is fully open. With an air pressure of 30 p.s.i the pressure available to lower stitch cam 207 approaches 30 pounds when the flapper 257 is fully closed.

After the machine is started, external influences may begin to interfere which, if uncorrected, would cause stitches of uneven character to be knit. For example, where certain types of knitting cams are used, the draw of the needles will tend to increase as the machine heats up due to the thinning of the lubricating oil and expansion of the metal parts. If not compensated for, the needles 204 will tend to draw more yarn than is being supplied by the yarn feeder 202, thus tending to increase the tension on the yarn and upset the desired balance between the yarn demand of the needles and the rate of yarn positively supplied. With our invention, however, the desired balance is maintained by the stitch control regulator 205 despite such influences, as described below.

As the needles 204 tend to fire deeper, more yarn tends to be drawn, and the loop of yarn 203a shortens, causing arm 210 to rise. This movement of arm 210 lowers rod 234 to depress flapper valve 257, opening orifice 256 so that more air escapes from the system than is entering through orifice 242. This action decreases the air pressure in cavity 243, and the piston will descend under the influence of springs 266, 267.

The descent of piston 245 causes lever 268 to move around pivot 270, raising ball 272 and stitch cam 207 to shorten the yarn draw of the needles. When stitch cam 207 reaches the position where the needles no longer tend to draw more yarn than the amount of yarn supplied by meter 202, piston 245 ceases its descent since, at this point, flapper 257 once again is depressed by rod 234 to the extent that the amount of air escaping orifice 256 equals the amount of air entering the system through orifice 242. Thus, piston 245 will arrive at a new equilibrium position corresponding to the new position of arm 210 and the new size of the loop 203a of yarn 203, and the balance between yarn supply and yarn demand is maintained. In practice, this adjustment is so precisely and quickly accomplished that no variation in stitch character or size can be detected in the fabric.

It will be seen that true servo action is provided by regulator 205 since piston 245 is constantly available for corrective action in rseponse to impulses from arm 210. When arm 210 moves, piston 245 follows to provide exact correction for variations indicated by such arm movement. Since this correction is without overcompensation, piston 245 comes to rest, as arm 210 stops, and is instantly available for new corrective action when required.

With the present invention, desired changes in the size of stitches being drawn by the needles may be effected merely by changing the rate at which the yarn meter 202 feeds yarn to the needles 204. This completely novel and extremely useful capability follows from the fact that for every position of arm 210 there is a corresponding equilibrium position of piston 245, and thus a corresponding yarn draw position of stitch cam 207.

Suppose, for example, that the machine 201 has been knitting relatively short stitches, and it is desired to knit stitches which are relatively longer. The rate at which yarn is metered to the needles may be increased by appropriate adjustment of the meter 202 while the machine is running in the manner described in our copending United States application Serial No. 275,619 filed April 25, 1963. The instant the rate of yarn feed is increased, the size of the loop 203a of yarn 203 increases since, at this instant, more yarn is being fed by meter 202 than needles 204 are using. The increased size of yarn loop 203a causes arm 210 to drop, lifting rod 234 from valve 257 and, as a result, valve 257 closes orifice 256. The resulting air pressure increase in cavity 243 raises piston 245, causing stitch cam 207 to lower, thereby increasing the yarn draw of the needles 204. The ascent of piston 245 stops when the stitch cam 207 is lowered to that position where the rate at which yarn is demanded by the needles is exactly equal to the new rate at which yarn is being provided by the meter 202. Piston 245 is now in a new equilibrium position, and the larger yarn loop 203a remains, with arm 210 in the lowered position. Since the yarn being demanded by the needles is exactly equal to the amount of yarn metered, larger stitches, all of uniform size and character, are knit.

In the same fashion, the adjustment of meter 202 may be made while the machine is idle. If, for example, it is desired to change from relatively long stitches to relatively short stitches, the meter is adjusted to decrease the rate of yarn fed. When the machine is started, the size of the yarn loop 203a will immediately decrease, causing arm 210 to rise to open flapper valve 257. As a consequence, piston 245 will move downward until stitch cam 207 is raised to that position where the rate at which yarn is demanded by the needles is equal to the new rate at which yarn is being provided by meter 202.

The present device includes a stop motion contact 229. Thus, if yarn 203 breaks, arm 210 will drop instantly, causing edge 227 of block 220 to engage contact 229, making a ground. Similarly, a sudden stoppage of compressed air from its source will decrease air pressure in cavity 243 so that piston 245 will descend, causing stitch cam 207 to rise. The resulting decrease in needle draw causes the yarn loop to enlarge to such extent that the arm 210 drops with the result that block 220 tilts to the extent that its edge 228 engages the electrical contact 229. Thus, the machine will stop without pressing the fabric off of more than a few needles.

As will be apparent to one skilled in the art the stitch control mechanism described herein may be readily applied to dial needle stitch cams of a knitting machine. Control and operation of the dial stitch cams will be like that of the cylinder stitch cam 207.

In certain uses of our invention, it may be desirable to have means for introducing a maximum limit beyond which the stitch cam cannot be moved by the stitch control apparatus. In particular, this is useful in counteracting the effect produced when a hole develops in the fabric. When this happens in a latch needle machine, for example, there is no yarn to open the latches. If the latches do not open of their own accord, the yarn will float. As a result, less yarn will be utilized than is being provided, the yarn reservoir loop will enlarge, and the stitch cam will be relatively sharply lowered. If the yarn being knit is weak, such lowering of the stitch cam may cause the yarn to break away from more needles, thus enlarging the hole, and more latches may fail to open.

In the case described above, the stitch control mechanism is caused to react by a false signal. For the above reasons, we have provided a limiting means which prevents the stitch cam from being moved beyond a predetermined limit.

In the modification of FIG. 17, there is shown a limit screw 501 which is capable of being vertically adjusted in a threaded bore 502 of portion 503 affixed to housing 212. The distal end of screw 501 is positioned above the extended tip of flapper valve 257. Thus, when piston 245 rises sufficiently high, the tip of the flapper valve will come into contact with the screw. If the piston continues to rise even higher, then the flapper valve will be opened, and the resulting loss of air through orifice 256 will lower the pressure under piston 245 to the extent that ascent of the piston will be halted.

From the above, it can be seen that screw 501 acts as a limiting means which establishes a maximum beyond which the piston cannot move. In turn, this limits the amount by which the stitch cam or other stitch drawing elements can be corrected.

It is to be understood that the range within which the cam can be moved is never decreased below an amount required to correct for minor errors, e.g., those caused by the clogging of yarn guides, off-level dials, etc. The limiting means, rather, prevents the cam from moving too far in response to a gross error, such as that which occurs when a hole is developed in the fabric.

While reference has been made in respect of controlling the stitch cam and needle cylinder, it is within the scope of this invention to control, through appropriate cam means, sinkers when such instrumentalities are used to measure out yarn for the knitting needles, or to control the position of burr wheels when used for the same purpose, or to control any other mechanism used in weft knitting which governs the size of the yarn loops being knit.

In FIG. 18, the servo-equipped stitch control mechanism 205 is shown applied to a stitch wheel 301 of a spring beard needle machine. Yarn 203 is fed by a positive yarn feeder, which, while not shown, is preferably of the same construction as feeder 17 previously described. From the feeder, the yarn travels through stationary guide 308, guide 209 at the end of servo arm 210, yarn guide 311 and thence to stitch wheel 301. Wheel 301 intermeshes with spring bearded needles 304 and measures out yarn 203 thereto.

As shown in FIG. 18, stitch wheel 301 is connected to shaft 320 which is suitably keyed in tubular support 325 and may move axially within said support 325. The extent of inward movement of shaft 320 may be adjusted by turning nut 326 fitted over the threaded end portion of said shaft.

Stitch control device 205 is mounted so that extension 215 is perpendicular to shaft 320. Ball 272 at the end of level 268 is fitted in a hole 320a drilled in shaft 320. As previously described, any movement of army 210 in response to a change in the size of yarn reservoir loop 203a will be transmitted into movement of lever 268. In this application of our invention, lever 268 will cause shaft 320, and thus stitch wheel 301, to move. Such movement will be either toward or away from the needles, depending upon the direction which arm 210 has moved.

Heretofore, it has been possible to apply only a very light tension to yarn where a stitch wheel is used. Indeed, the slightest pull on the yarn usually results in the yarn being broken by the wheel. For this reason it has not been practical, for instance, to utilize pull down stop motions or positive feeders in connection with stitch wheels. These drawbacks are eliminated when our invention is used, as shown in FIG. 18.

The stitch control mechanism of our invention can also be utilized to control sinkers when such instrumentalities are used to measure out yarn for knitting needles. Thus, FIGS. 19 and 20 illustrate the manner in which our servo stitch control mechanism is applied to a Wildman spring beard needle machine. It is understood that a positive yarn feeder, preferably constructed like feeder 17 described herein, is used in conjunction with the servo mechanism 205.

As shown best in FIG. 20, the ball 272 at the end of lever 268 of stitch control 205 is fitted within bore 402 of a slide 401 connected to sliding cam 405 by screw 403. Cam 405 controls the movement of sinkers 406 as they measure yarn about needles 404.

From the foregoing, it is evidence that the piston 245 is part of a hydraulically operable independently powered means which is connected to the stitch drawing elements for adjustment thereof, and that valve 257 forms part of a control means for the hydraulically powered means.

Of course, it is within the scope of this invention to use other types of positive yarn feeding means in place of yarn feeder 17, in connection with the stitch regulators 19 and 205. Alternatively, the yarn feeder 17, if desired may be used without the stitch length control mechanism 19 and 205 in certain applications.

While, in accordance with the provisions of the patent statute, there has been illustrated and described herein the best form of embodiment of this invention now known, it will be apparent to those skilled in the art that changes may be made in the method and the form of the apparatus described herein, and in the use thereof, without departing from the spirit and the scope of the invention as set forth in the appended claims. As will be readily understood, certain features of this invention may be used to advantage without a corresponding use of other features thereof.

We claim:

1. Apparatus for positively feeding a strand of material at selected uniform rates including:
   (a) a shaft,
   (b) a pair of axially spaced discs carried by said shaft, each of the opposing faces of said discs having a spiral groove formed therein,
   (c) a plurality of radially retractable strand engaging elements extending between said discs each having an arcuate outer surface,
   (d) a pair of pins attached to each of said elements, each pin adapted for engagement with the spiral groove of one of the discs, and each pair of pins for each element being disposed a selected radial distance from the outer surface thereof, said selected distances varying for each strand engaging element so that the outer surfaces of all of the strand engaging elements are at all times maintained equidistant from said shaft when the pins are engaged in the spiral grooves of the discs.

2. A yarn feeding device for positively delivering yarn to a textile machine and the like comprising:
   (a) a revolvable shaft,
   (b) a pair of axially spaced discs carried by said shaft, said discs each having a complemental spiral groove in its opposing face,
   (c) a pair of axially spaced spool heads positioned between said discs, said spool heads each having a plurality of radially extending slots, each slot of one spool being in opposing relation to a slot of the other spool to form a pair,
   (d) a plurality of axially extending yarn engaging elements, each having an outer surface, disposed between the spool heads,
   (e) an elongated slide attached to each end of each yarn engaging element so that one slide of a given element slides in one slot of one of said opposing pairs of slots, and the other slide of the given element slides in the opposite slot of the pair,
   (f) a pin attached to each of said elongated slides and adapted to engage the spiral groove in the adjacent disc,
   (g) the pins for each yarn engaging element being disposed a selected radial distance from the outer surface thereof, said selected distances varying for each yarn engaging element whereby the outer surfaces of all of said yarn engaging elements are at all times maintained equidistant from the axis of the spool when the pins are engaged in the complemental spiral grooves of the discs.

3. The invention of claim 2 further including drive means affixed to said shaft adapted to be driven from said textile machine, whereby said shaft is rotated at a given rate directly proportionate to the speed of the textile machine.

4. A positive yarn feeding device for a textile machine including:
   (a) a shaft,
   (b) means for rotating the shaft,
   (c) a pair of spaced discs mounted on said shaft, said discs each having a spiral groove formed therein, said spiral grooves being in complemental relation,
   (d) a spool supported by said shaft intermediate the discs,
   (e) a plurality of elongated radially retractable elements supported by the spool, and
   (f) a pair of pins disposed in spaced relation on the retractable elements, each pin adapted for engagement with the spiral groove of one of the discs, and each pair of pins for each retractable element being disposed at a selected different distance from the longitudinal axis of its radially retractable element, whereby the yarn engaging surfaces of said elements are maintained at all times equidistant radially from the shaft when the pins are engaged in the complemental spiral grooves.

5. In a knitting machine having a complement of independent needles and an adjustable stitch cam therefor,
   (a) a diametrically expansible and contractable spindle for positively delivering yarn to the needles at a predetermined feeding rate,
   (b) means for selectively changing the rate of yarn delivery by enlarging or reducing the diameter of said spindle, and
   (c) a stitch regulator operative to control the yarn demand of the needles including a movable yarn tensioning arm connected directly to the stitch cam, said arm being automatically responsive to influences acting upon the yarn to adjust the position of the stitch cam to maintain the demand of the needles for yarn in balance with the rate of yarn delivery.

6. The invention of claim 7 further including stop motion means to terminate operation of the machine in the event that the arm moves beyond a predetermined point.

7. A method of knitting a fabric comprising the steps of feeding yarn positively to a plurality of needles at a preselected rate, setting the yarn draw of the needles to balance the demand of the needles for yarn with the rate of yarn feed, delivering the yarn to and from a reservoir of said yarn as it is fed to the needles, and adjusting the draw of the needles in response to any change in the amount of yarn in the reservoir to maintain the demand of the needles for yarn in balance with the rate of yarn feed.

8. The method of claim 7 further including the step of changing the draw of the needles at a rate proportionate to the rate of change in the amount of yarn in the reservoir.

9. The invention of claim 7 further including the step of terminating knitting when the yarn in the reservoir reaches a predetermined amount.

10. In a circular knitting machine having a needle cylinder, a plurality of needles and a stitch cam, that method of knitting a fabric which comprises feeding yarn positively to the needles at a preselected rate, setting the relative positions of the stitch cam and cylinder to balance the demand of the needles for yarn with the rate of yarn fed, forming the yarn into a loop as it is fed to the needles, and adjusting the relative positions of the stitch cam and cylinder in response to and simultaneously with any change in size of the yarn loop to maintain the demand of the needles for yarn in balance with the rate of yarn feed.

11. The invention of claim 10 where the rate of change of relative positions of the stitch cam and cylinder is in direct proportion to the rate of change in size of the yarn loop.

12. A method of controlling stitch lengths in a circular knitting machine having a needle cylinder with a complement of needles, a vertically movable stitch cam and a positive yarn feeder formed with a diametrically expansible and contractable spindle, said method including the steps of: adjusting the diameter of the spindle to feed yarn positively to the needles at a preselected rate, setting the relative positions of the stitch cam and cylinder to harmonize the yarn demand of the needles with said preselected feeding rate, feeding yarn positively to the needles by spiralling the yarn a plurality of times around the spindle, forming the yarn into a loop as it passes from the spindle to the needles, applying a selected tension to the yarn loop to form said loop initially of a predetermined size, and adjusting the relative positions of the stitch cam and cylinder in response to and simultaneously with any change in size of the yarn loop to maintain the yarn demand of the needles in balance with said preselected feeding rate.

13. The invention of claim 12 further including the step of maintaining constant tension on the yarn loop regardless of any change in size thereof.

14. A method of knitting a fabric comprising the steps of setting a positive yarn supply device to furnish a predetermined length of yarn to a set of stitch drawing elements for each course of the fabric, applying a predetermined constant tension to the yarn as it is furnished, forming the yarn into stitches by the stitch drawing elements and causing said yarn to adjust the stitch drawing elements relative to each other, as required during knitting, to set a said predetermined length of yarn into each fabric course under the predetermined constant tension, with each stitch of each course formed of uniform size.

15. In a knitting machine having a complement of independent needles, an adjustable stitch cam and positive supply means for providing yarn to the needles, an automatic stitch length control mechanism including:
(a) an axially movable slide having the stitch cam affixed thereto,
(b) an eccentric operatively connected to the slide and stitch cam to vary the yarn draw of the needles,
(c) an arm affixed to the eccentric, said arm controlling the extent to which the eccentric moves the slide and stitch cam, and
(d) an eyelet disposed on the arm through which yarn passes to the needles from the supply.

16. The invention of claim 15 wherein the positive supply means includes means to provide yarn at selectively variable rates to the needles.

17. The invention of claim 15 further including pivot means for the arm and eccentric; and spring-like means for urging the arm and eccentric about the pivot means in a direction to deepen the yarn draw of the needles.

18. A knitting machine having positive yarn supply means for providing yarn to the needles at a preselected rate including:
(a) a pivotally mounted arm adapted to form the yarn passing from said supply means to said needles into a reservoir loop,
(b) an adjustable stitch cam, and
(c) means connecting said arm to said stitch cam operative to move the cam simultaneously with any movement of said arm in response to variations in the size of said reservoir loop.

19. A knitting machine having positive yarn supply means for providing yarn to the needles at a preselected rate including:
(a) a pivotally mounted arm adapted to form the yarn passing from said supply means to said needles into a reservoir loop,
(b) a stitch wheel adapted to be moved toward and away from the needles, and
(c) means connecting said arm to said stitch wheel operative to move said wheel simultaneously with any movement of said arm in response to variations in the size of said reservoir loop.

20. A knitting machine having positive yarn supply means for providing yarn to the needles at a preselected rate including:
(a) a pivotally mounted arm adapted to form the yarn passing from said supply means to said needles into a reservoir loop,
(b) sinkers for measuring out yarn to be set into the fabric and an adjustable cam therefor,
(c) means connecting said arm to said cam operative to move the cam simultaneously with any movement of said arm in response to variations in the size of said reservoir loop.

21. In a weft fabric knitting machine having adjustable stitch drawing elements and adjusting means therefor adapted to regulate the size of stitches drawn by said stitch drawing elements, said stitch drawing elements including needles, an automatic stitch length control regulator means including:
(a) positive yarn supply means for delivering yarn to the needles at a preselected rate,
(b) sensor means for continuously comparing the rate at which yarn is delivered to the needles with the yarn demand of the stitch drawing elements,
(c) control means operatively connecting said sensor means and said adjusting means and operative to regulate the adjusting means simultaneously with any change in yarn demand detected by the sensor means and
(d) means for maintaining the control means in operative relation to the sensor means and adjusting means at all times.

22. In a weft fabric knitting machine having adjustable stitch drawing elements including needles and yarn supply means for providing yarn to the needles at a preselected rate, an automatic stitch length control mechanism including:
(a) yieldable means for forming the yarn into a reservoir between said supply means and said needles, and
(b) mechanical linkage means operatively connecting the yieldable means with the stitch drawing elements, said mechanical linkage means being operative to move the stitch drawing elements relative to each other in response to any change in the size of the yarn reservoir.

23. In a weft knitting machine having stitch drawing elements, the combination including a positive yarn feeder for feeding yarn at a uniform rate, means to form a loop in the yarn between the positive yarn feeder and the stitch drawing elements, means adapted to adjust the stitch drawing elements in response to variations in the size of the yarn loop, and stop motion means adapted to terminate the operation of the machine in the event that the yarn loop reaches a predetermined size.

24. The invention of claim 23 wherein the loop forming means comprises a movable yarn tensioning arm, and wherein the stop motion means comprises a pair of electrical contacts spaced a predetermined distance apart along the path of movement of said arm.

25. In a knitting machine having stitch drawing elements, positive yarn feeding means including means for selectively setting the rate of feed thereof, control means responsive to any setting of the positive yarn feeding means automatically operative to adjust the stitch drawing elements of the machine to accept and knit yarn at the selected positive feeding rate under constant tension.

26. In a knitting machine having adjustable stitch drawing means, a positive yarn feeder and a movable arm for forming the yarn passing from the feeder to the stitch drawing means into a loop, a servo mechanism for maintaining the demand of the stitch drawing means for yarn in balance with the rate of yarn fed including:
 (a) a movable element connected to the stitch drawing means for adjustment of said means,
 (b) a source of power for moving said movable element, and
 (c) control means affixed to said element for movement therewith and responsive to any movement of said arm to vary the power exerted upon said element whereby the element always follows any movement of said arm and the control means is maintained in operative relationship with the arm at all times.

27. The invention of claim 2 further including means for releasably clamping together said discs, spool heads and yarn engaging elements so that said discs, heads and elements revolve in unison with said shaft and whereby said spool heads may be shifted angularly of said discs upon release of said means to move said elements radially to vary the circumference thereof.

28. The invention of claim 27 further including means for indicating the circumference of said yarn engaging elements whereby the amount of yarn fed by the feeding device may be precisely calibrated.

29. In a weft fabric knitting machine having needles, adjustable means for regulating the yarn demand of the machine and positive yarn feeding means for delivering yarn to the needles at a uniform rate; stitch length regulator means for automatically maintaining said yarn demand in balance with said uniform delivery rate comprising:
 (a) sensor means for continuously comparing the rate of yarn delivered to the needles and the yarn demanded by the machine, said sensor means being adapted to generate an impulse in immediate response to, and in exact proportion with any variation between said rate and said yarn demand,
 (b) hydraulically powered means connected to the adjustable control means for adjustment thereof, and
 (c) control means for said hydraulically powered means, responsive to any impulse generated by said sensor means, to actuate said hydraulically powered means to adjust said adjustable means simultaneously with and in proportion to said impulse to maintain the yarn demand of the machine in balance with said yarn delivery rate.

30. The invention of claim 29
 (a) wherein the hydraulically powered means includes a movable piston disposed in a cylinder, and
 (b) wherein the control means for said hydraulically powered means includes valve means adapted to regulate hydraulic force on the piston.

31. The invention of claim 29 wherein the valve means is mounted upon the piston for movement therewith.

32. The invention of claim 29 further including adjustable limit means positioned at a selected point along the cylinder in the path of said valve means and adapted to open said valve means at said point whereby movement of the piston beyond said point is prevented.

33. In a weft fabric knitting machine having independently movable needles, a movable stitch cam therefor and positive yarn feeding means for delivering yarn to the needles at a uniform rate; stitch length regulator means for automatically maintaining yarn demand of the needles in balance with said uniform delivery rate comprising:
 (a) sensor means for continuously comparing the rate of yarn delivered to the needles and the yarn demanded by the needles, said sensor means being adapted to generate an impulse in immediate response to, and in exact proportion with, any variation between said rate and said yarn demand,
 (b) hydraulically powered means connected to said stitch cam and operative to move said cam, and
 (c) control means for said hydraulically powered means, responsive to any impulse generated by said sensor means, to actuate said hydraulically powered means to move said cam simultaneously with and proportionate to said impulse to maintain the yarn demand of the needles in balance with said yarn delivery rate.

34. In a weft fabric knitting machine having needles, sinkers for measuring yarn delivered to the needles, a movable cam for said sinkers, and positive yarn feeding means for delivering yarn to the needles at a uniform rate; stitch length regulator means for automatically maintaining the yarn demand of the machine in balance with said uniform delivery rate comprising:
 (a) sensor means for continuously comparing the rate of yarn delivered to the needles and the yarn demanded by the machine, said sensor means being adapted to generate an impulse in immediate response to, and in exact proportion with, any variation between said rate and said yarn demand,
 (b) hydraulically powered means connected to said sinker cam and operative to move said cam, and
 (c) control means for said hydraulically powered means, responsive to any impulse generated by said sensor means, to actuate said hydraulically powered means to move said sinker cam simultaneously with and proportionate to said impulse to maintain the yarn demand of the machine in balance with said yarn delivery rate.

35. In a weft fabric knitting machine having needles, a stitch wheel for measuring yarn delivered to the needles, said stitch wheel being movable toward and away from the needles, and positive yarn feeding means for delivering yarn to the needles at a uniform rate; stitch length regulator means for automatically maintaining the yarn demand of the machine in balance with said uniform delivery rate comprising:
 (a) sensor means for continuously comparing the rate of yarn delivered to the needles and the yarn demanded by the machine, said sensor means being adapted to generate an impulse in immediate response to, and in exact proportion with any variation between said rate and said yarn demand,
 (b) hydraulically powered means connected to said stitch wheel and operative to move said wheel toward and away from the needles, and
 (c) control means for said hydraulically powered means, responsive to any impulse generated by said sensor means, to actuate said hydraulically powered means to move said stitch wheel simultaneously with and proportionate to said impulse to maintain the yarn demand of the machine in balance with said yarn delivery rate.

36. The invention of claim 1, further including an auxilliary roll adapted to spiral yarn about said strand engaging elements.

References Cited by the Examiner
UNITED STATES PATENTS

| | | | |
|---|---|---|---|
| 360,735 | 4/1887 | Schroeder et al. | 66—125 X |
| 2,186,814 | 1/1940 | Adams | 66—125 |
| 2,227,355 | 12/1940 | Lawson | 66—132 X |
| 2,229,796 | 1/1941 | Carlson | 242—110.1 |
| 2,516,535 | 7/1950 | Stack | 66—146 |
| 2,819,760 | 1/1958 | Norhead | 242—110.1 X |
| 2,838,923 | 6/1958 | Lassiter | 66—132 |
| 2,938,365 | 5/1960 | Lassiter | 66—132 |

(Other references on following page)

UNITED STATES PATENTS 3,029,619  4/1962  Lawson.
3,083,924  4/1963  Vossen et al. _____ 66—132 X

FOREIGN PATENTS 964,455    1/1950   France.
1,023,211  12/1952  France.
697,976    10/1953  Great Britain.
789,822    1/1958   Great Britain.
861,880    3/1961   Great Britain.

DONALD W. PARKER, *Primary Examiner.*

W. C. REYNOLDS, *Assistant Examiner.*